United States Patent [19]
Takemura et al.

[11] Patent Number: 5,847,041
[45] Date of Patent: Dec. 8, 1998

[54] POLYCARBONATE/POLYOLEFIN BASED RESIN COMPOSITIONS AND THEIR PRODUCTION PROCESSES AND USES

[75] Inventors: Kazuya Takemura; Masahiko Kajioka; Kazumichi Sashi; Shigeru Takano; Eiichi Sumita, all of Chiba, Japan

[73] Assignee: Kawasaki Steel Corporation, Kobe, Japan

[21] Appl. No.: 686,236

[22] Filed: Jul. 23, 1996

Related U.S. Application Data

[62] Division of Ser. No. 402,688, Mar. 13, 1995, Pat. No. 5,594,062.

[30] Foreign Application Priority Data

| Mar. 16, 1994 | [JP] | Japan | HEI6-71555 |
| Aug. 4, 1994 | [JP] | Japan | HEI6-202824 |
| Oct. 4, 1994 | [JP] | Japan | HEI6-240044 |

[51] Int. Cl.⁶ ............................ C08L 69/00; C08L 23/00
[52] U.S. Cl. ........................... 524/504; 524/508; 525/67; 525/69; 525/133; 525/148
[58] Field of Search ..................... 524/504, 508; 525/67, 69, 133, 148

[56] References Cited

U.S. PATENT DOCUMENTS

| 5,130,372 | 7/1992 | Lences et al. | 525/183 |
| 5,508,347 | 4/1996 | Ohmae | 525/67 |
| 5,594,062 | 1/1997 | Takemura | 525/67 |

FOREIGN PATENT DOCUMENTS

| 0 119 531 A3 | 9/1984 | European Pat. Off. . |
| 0 181 094 A1 | 5/1986 | European Pat. Off. . |
| 0 480 770 A3 | 4/1992 | European Pat. Off. . |
| 0 485 631 A1 | 5/1992 | European Pat. Off. . |
| 0 545 902 A3 | 6/1993 | European Pat. Off. . |
| 0 629 661 A1 | 12/1994 | European Pat. Off. . |
| 2 649 709 | 1/1991 | France . |
| 58-225151 | 12/1983 | Japan . |
| 63-215750 | 9/1988 | Japan . |
| 63-215752 | 9/1988 | Japan . |
| 64-075543 | 3/1989 | Japan . |
| 3-039344 | 2/1991 | Japan . |
| 4-277542 | 10/1992 | Japan . |

*Primary Examiner*—David Buttner
*Attorney, Agent, or Firm*—Panitch Schwarze Jacobs & Nadel, P.C.

[57] ABSTRACT

This invention provides the following resin composition, method for producing the composition, resin slide material, organic solvent resist material and glass fiber reinforced composition obtained therefrom. A polycarbonate/polyolefin based resin composition exhibiting an improved polycarbonate/polyolefin compatibility prepared by melt kneadin (A) a polycarbonate resin; (B) a polyolefin resin; (C) a polyolefin resin that has been modified with at least one functional group selected from the group consisting of epoxy, carboxyl, and an acid anhydride groups; (D) a compound represented by the formula: $HOOC-R-NH_2$ wherein R represents at least one member selected from the group consisting of an alkene group, an alkylidene group, and an oligomethylene group containing 5 or more carbon atoms, and phenylene group and naphthylene group optionally substituted with an alkyl group; and optionally, (E) a styrene copolymer resin.

18 Claims, 12 Drawing Sheets

X 3000

X 3000

SURFACE

SURFACE

A  X6000 Example 24

B  X6000 Comparative Example 17

A (X 6.5) PC

B (X 6.5) PC/PET

C (X 6.5) Comparative Example 21

D (X 6.5) Example 36

E (X 6.5) Comparative Example 22

F (X 6.5) Example 37

POLYCARBONATE/POLYOLEFIN BASED RESIN COMPOSITIONS AND THEIR PRODUCTION PROCESSES AND USES

CROSS-REFERENCE TO RELATED APPLICATIONS

This is a division of application Ser. No. 08/402,688, filed Mar. 13, 1995, now U.S. Pat. No. 5,594,062.

BACKGROUND OF THE INVENTION

First of all, this invention relates to a resin composition comprising a polycarbonate and a polyolefin which exhibits an improved polycarbonate/polyolefin compatibility and improved delamination resistance and which also has sufficient mechanical strength and heat resistance. This invention also relates to a method for producing such resin composition. In the second place, this invention relates to resin compositions comprising a polycarbonate and a polyolefin which have improved wear resistant properties or an improved solvent resistance, and articles produced by melt molding such resin compositions. In the third place, this invention relates to compositions wherein the above-described resin compositions are further blended with glass fiber, and articles molded from such compositions. The materials provided by the present invention are particularly preferable for use in office automation equipment, household appliance, automobile components, medical instruments, and the like.

Polycarbonate resins have been widely used in the field of automobiles and electricity owing to their excellent heat resistance, impact resistance, and electric properties as well as good dimensional stability. Polycarbonate resins, however, suffer from high melt viscosity and poor organic solvent resistance as well as poor abrasion/friction properties, and their use was limited in the fields wherein such properties were required. In order to obviate such defects of the polycarbonates, various attempts have been suggested wherein the polycarbonate is mixed with a polyolefin (See for example, Japanese Patent Publication No. 40(1965)-13664 and Japanese Patent Application Laid-Open No. 59(1984)-22371-). Such resin compositions, however, failed to prove practical since the low compatibility of the polycarbonate and the polyolefin resulted in delamination, and hence, in poor appearance of the produce when a molded article is produced from the resin composition by such means as injection molding. Various attempts have been made to improve the compatibility of the polycarbonate and the polyolefin by incorporating into the polycarbonate-polyolefin resin composition a polystyrene-polyolefin copolymer such as SEBS (styrene-ethylene/butylene-styrene copolymer), SEP (styrene-ethylene/propylene), or the like (See for example, Japanese Patent Application Laid-Open No. 64(1989)-75543). However, the incorporated polystyrene-polyolefin copolymer is of elastomeric nature, and the resulting resin composition suffered particularly from poor heat resistance and flexural rigidity.

Japanese Patent Application Laid-Open No. 63(1988)-215750 discloses a resin composition wherein the polycarbonate-polyolefin resin further comprises a polycarbonate having a terminal carboxyl group and a polypropylene having epoxy group; and Japanese Patent Application Laid-Open No. 63(1988)-215752 discloses a resin composition wherein the polycarbonate-polyolefin resin further comprises a polycarbonate having a terminal hydroxyl group and polypropylene having carboxyl group. Such compositions do not undergo delamination, and the articles prepared from such compositions exhibit excellent mechanical strength and organic solvent resistance as well as improved outer appearance with no delamination. However, the carboxyl- and the hydroxyl-containing polycarbonates used or constituting such resins are those respetively prepared by adding a special monomer in the polymerization stage of the polycarbonate resin, and production of such resins would require a polycarbonate polymerization installation. Therefore, processes utilizing such components would out a heavy financial burden to resin manufacturers that do not have such polycarbonate polymerization installation. Accordingly, production of the polycarbonate-polyolefin resin further comprising such resin component was rather difficult. In addition, the properties of the resin composition estimated from the value described in the disclosed specification are not fully sufficient in view of the properties inherent to the polycarbonate, and further improvements in the properties are desired.

Attempts have also been made to add a fluororesin such as polytetrafluoroethylene to the polycarbonate resin to thereby improve friction/abrasion properties. Such composition has improved wear resistant properties in addition to the above-described excellent properties inherent to the polycarbonate resin, and therefore, such composition is used for such parts as gears and cums of office automation equipment and household appliance where heat resistance, impact strength, and wear resistant properties are required. However, the fluororesin used in such composition is rather expensive, and upon thermal disposal of the resin composition, the fluororesin would generate toxic gases. In view of such situation, there has been a strong demand for a polycarbonate based resin slide material that may substitute for the polycarbonate/fluororesin based resin composition.

On the other hand, polyolefin resins, and in particular, high density polyethylene, low density polyethylene, and straight-chain low density polyethylene are inexpensive and excellent in friction/abrasion properties. Such polyolefin resins are, however, inferior to the polycarbonate resins in their heat resistance, flexural rigidity, and flame retardancy. Therefore, it has been difficult to use the polyolefin resin in the applications where the polycarbonate/fluororesin based resin composition had been used. In view of such situation, various attempts have been made to mix the polycarbonate with the polyethylene in order to develop a resin composition which is provided with both the excellent heat resistance, Impact resistance, and flame retardancy of the polycarbonate resin and the excellent friction/abrasion properties of the polyethylene. In spite of such attempts, the markedly poor compatibility of the polycarbonate with the polyethylene resulted in delamination of the molded article, especially upon frictional contact or under abrasion, leading to poor abrasion properties. Accordingly, the mixing of the polycarbonate and the polyethylene by simple kneading proved insufficient.

Polycarbonate resins are amorphous, and suffer from cracks when they are brought in contact with an organic solvent for a prolonged period. Such cracks result in significantly poor appearance and markedly reduced mechanical strength. Therefore, use of the polycarbonate resins was limited in applications where organic resistance was required. In view of such situation, attempts have been made to combine the polycarbonate with a crystalline polyester such as polyethylene terehthalate and polybutylene terephthalate to thereby improve the organic solvent resistance of the polycarbonate. Such compositions exhibit good compatibility and well balanced mechanical strength and organic solvent resistance. However, the polyethylene terephthalate and the polybutylene terephthalate used in such resins are rather expensive. Although polyolefins such as polypropylene and polyethylene are excellent in organic solvent resistance and more inexpensive than such polyesters, polyolefins suffer from poor compatibility with the polycarbonate. As described above, mixing of the polycarbonate and the polyolefin by simple kneading failed to provide the molded article whose organic solvent resistance and appearance (resistance to delamination) were fully improved, Accordingly, no means are so far available that can improve the solvent resistance of the polycarbonate resin in an inexpensive manner.

Glass fiber-reinforced polycarbonate resins comprising a polycarbonate resin and glass fibers blended therewith have improved flexural rigidity, heat resistance and abrasion properties compared to the resin composition solely comprising the polycarbonate resin. The glass fiber-reinforced polycarbonate resins, however, are still insufficient in abrasion properties, and accordingly, use of such resins was limited in the applications where friction/abrasion properties are required, for example, gear, cum, and bearing.

In view of such situation, attempts have been made to combine the glass fiber-reinforced polycarbonate resins with a fluororesin such as polytetrafluoroethylene to thereby improve the friction/abrasion properties. Such resin compositions having the fluororesin incorporated therein have improved wear resistant properties in addition to the above-described excellent properties inherent to the polycarbonate resin, and therefore, such compositions are used for such parts as gears and cums of office automation equipment and household appliance where heat resistance, impact strength, flexural rigidity, and wear resistant properties are required However, the fluororesin used in such composition suffer from the disadvantages as described above, and there is a strong demand for a polycarbonate based resin slide material that can substitute for the glass fiber-reinforced polycarbonate/fluororesin based resin compositions.

On the other hand, polyolefin resins, and in particular, high density polyethylene, low density polyethylene, and straight-chain low density polyethylene are inexpensive and excellent in friction/abrasion properties, as described above. However, the polyolefin resins having glass fibers admixed therewith are inferior to the glass fiber-reinforced polycarbonate resins in their heat resistance, flexural rigidity, and flame retardancy. Therefore, it has been difficult to use the glass fiber-reinforced polyolefin resin in the applications where the glass fiber-reinforced polycarbonate/fluororesin based resin compositions had been used.

In view of such situation, various attempts have been made to incorporate the glass fiber into the mixture of the polycarbonate with the polyethylene in order to develop a glass fiber-reinforced polycarbonate based resin composition which is provided with both the excellent heat resistance, impact resistance, and flame retardancy of the polycarbonate resin and the excellent friction/abrasion properties of the polyethylene. As described above, the compatibility of the polycarbonate with the polyethylene is quite poor, and the article molded from the resin composition prepared by simple kneading of the components suffered from delamination, especially upon frictional contact or under abrasion, leading to poor abrasion properties. Such situation is not at all improved by mere incorporation of the glass fiber into the resin composition.

First object of the present invention is to provide a polycarbonate/polyolefin based resin composition which is provided with the excellent mechanical properties of the polycarbonate and the excellent molding properties of the polyolefin, and which is excellent in surface properties without suffering from delamination; and to enable the production of such polycarbonate/polyolefin based resin composition by blending readily available starting materials in a convenient manner.

Second object of the present invention is to provide a method for producing such polycarbonate/polyolefin based resin composition wherein a simple kneading machine may be utilized in the production.

Third object of the present invention is to provide an inexpensive resin slide material with excellent heat resistance, mechanical properties, and flame retardancy as well as sufficient wear resistant properties; and more illustratively, to provide a polycarbonate/polyolefin based resin composition exhibiting an improved polycarbonate/polyolefin compatibility and improved wear resistant properties as well as a molded article produced by melt molding such resin composition.

Fourth object of the present invention is to provide an inexpensive polycarbonate/polyolefin based resin composition with excellent heat resistance, mechanical properties, and flame retardancy as well as sufficient organic solvent resistance which exhibits improved polycarbonate/polyolefin compatibility; and a molded material produced by melt molding such resin composition.

Fifth object of the present invention is to provide an inexpensive glass fiber-reinforced polycarbonate/polyolefin based resin composition with excellent heat resistance, mechanical properties, and flame retardancy as well as sufficient wear resistant properties which exhibits improved polycarbonate/polyolefin compatibility; and to provide a molded article with excellent heat resistance, mechanical properties, and flame retardancy as well as sufficient wear resistant properties fabricated from such glass fiber-reinforced polycarbonate-polyolefin based resin composition.

SUMMARY OF THE INVENTION

According to the present invention, there is provided a precursor of a compatibilizer for a polycarbonate resin and a polyolefin resin prepared by reacting
(C) a polyolefin resin that has been modified with at least one functional group selected from the group consisting of epoxy, carboxyl, and an acid anhydride groups; and
(D) a compound represented by the formula: HOOC—R—$NH_2$ wherein R represents at least one member selected from the group consisting of an alkene group, an alkylidene group, and an oligomethylene group containing 5 or more carbon atoms, and phenylene group and naphthylene group optionally substituted with an alkyl group.

According to the present invention, there is also provided a compatibilizer for a polycarbonate resin and a polyolefin resin prepared by reacting
(A) a polycarbonate resin;
(C) a polyolefin resin that has been modified with at least one functional group selected from the group consisting of epoxy, carboxyl, and an acid anhydride groups; and
(D) a compound represented by the formula: HOOC—R—$NH_2$ wherein R represents at least one member selected from the group consisting of an alkene group, an alkylidene group, and an oligomethylene group containing 5 or more carbon atoms, and phenylene group and naphthylene group optionally substituted with an alkyl group.

Furthermore, there is provided according to the present invention a polycarbonate/polyolefin based resin composition exhibiting an improved polycarbonate/polyolefin compatibility prepared by melt kneading (A) a polycarbonate resin;

(C) a polyolefin resin that has been modified with at least one functional group selected from the group consisting of epoxy, carboxyl, and an acid anhydride groups; and (D) a compound represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group.

Still further, there is provided according to the present invention a polycarbonate/polyolefin based resin composition exhibiting an improved polycarbonate/polyolefin compatibility prepared by melt kneading (A) a polycarbonate resin;

(B) a polyolefin resin;

(C) a polyolefin resin that has been modified with at least one functional group selected from the group consisting of epoxy, carboxyl, and an acid anhydride groups; and (D) a compound represented by the formula: HOOC—R—NH$_2$ wherein R represents at least one member selected from the group consisting of an alkene group, an alkylidene group, and an oligomethylene group containing 5 or more carbon atoms, and phenylene group and naphthalene group optionally substituted with an alkyl group.

Still further, there is provided according to the present invention a polycarbonate/polyolefin based resin composition exhibiting an improved polycarbonate/polyolefin compatibility prepared by melt kneading (A) a polycarbonate resin;

(B) a polyolefin resin;

(C) a polyolefin resin that has been modified with at least one functional group selected from the group consisting of epoxy, carboxyl, and an acid anhydride groups;

(D) a compound represented by the formula: HOOC—R—NH$_2$ wherein R represents at least one member selected from, the group consisting of an alkene group, an alkylidene group, and an oligomethylene group containing 5 or more carbon atoms, and phenylene group and naphthylene group optionally substituted with an alkyl group; and (E) a styrene copolymer resin.

Still further, there is provided according to the present invention a polycarbonate/polyolefin based resin composition exhibiting an improved polycarbonate/polyolefin compatibility wherein 40 to 99% by weight of the component (A);

60 to 0% by weight of the component (B);

0.5 to 60% by weight of the component (C); and 0.05 to 5% by weight of the component (D)

are melt kneaded.

Still further, there is provided according to the present invention a polycarbonate/polyolefin based resin composition exhibiting an improved polycarbonate/polyolefin compatibility wherein 40 to 99% by weight of the component (A);

60 to 0% by weight of the component (B);

0.5 to 60% by weight so the component (C);

0.05 to 5% by weight so the component (D); and 0.1 to 30% by weight of the component (E)

are melt kneaded.

Still further, there is provided according to the present invention a polycarbonate/polyolefin based resin composition exhibiting an improved polycarbonate/polyolefin compatibility wherein 1 to 99% by weight of the component (A);

98 to 0% by weight of the component (B);

0.5 to 99% by weight of the component (C); and 0.05 to 5% by weight of the component (D)

are melt kneaded.

Still further, there is provided according to the present invention a polycarbonate/polyolefin based resin composition exhibiting an improved polycarbonate/polyolefin compatibility wherein 1 to 99% by weight of component (A)

98 to 0% by weight of component (B);

0.5 to 99% by weight of component (C);

0.05 to 5% by weight of component (D); and 0.1 to 30% by weight of component (E)

are melt kneaded.

Still further, there is provided according to the present invention a polycarbonate/polyolefin based resin composition wherein the polyolefin in said modified polyolefin (C) is at least one member selected from the group consisting of polyethylene and polypropylene.

Still further, there is provided according to the present invention a polycarbonate/polyolefin based resin composition wherein the modified polyolefin (C) is at least one member selected from the group consisting of maleic anhydride-modified Linear low density polyethylene, maleic anhydride-modified low density polyethylene, and maleic anhydride-modified high density polyethylene.

Still further, there is provided according to the present invention a molded article produced by melt molding the resin composition.

Still further, there is provided according to the present invention a molded article wherein the polyolefin is dispersed in the polycarbonate in particulate form, and the particulate polyolefin present in the region from surface of the article to a depth of 20 µm has an average aspect ratio (major axis/minor axis) of up to 5.

Still further, there is provided according to the present invention a glass fiber-reinforced resin composition comprising 95 to 60% by weight of the polycarbonate/polyolefin based resin composition; and 5 to 40% by weight of glass fibers.

Still further, there is provided according to the present invention a molded article produced by melt molding the glass fiber-reinforced resin composition.

Still further, there is provided according to the present invention a molded material having an improved solvent resistance comprising the molded article.

Still further, there is provided according to the present invention a molded material having improved wear resistant properties comprising the molded article.

Still further, there is provided according to the present invention a process for producing the resin composition comprising the step of melt kneading the compatibilizer precursor with the polycarbonate resin (A).

Still further, there is provided according to the present invention a process for producing the resin composition comprising the step of melt kneading the compatibilizer precursor with the polycarbonate resin (A), the polyolefin resin (B) and the styrene copolymer resin (E) simultaneously or sequentially in an arbitrary order.

Still further, there is provided according to the present invention a process for producing the resin composition comprising the step of melt kneading the compatibilizer with the polycarbonate resin (A).

Still further, there is provided according to the present invention a process for producing the resin composition comprising the step of melt kneading the compatibilizer with the polycarbonate resin (A), the polyolefin resin (B) and the styrene copolymer resin (E) simultaneously or sequentially in an arbitrary order.

Still further, there is provided according to the present invention a process for producing the resin composition comprising the steps of melt kneading the polyolefin resin (B), an acid anhydride, and the compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group; and continuing the melt kneading after adding the polycarbonate resin (A) and the styrene copolymer resin (E) simultaneously or sequentially in an arbitrary order.

Still further, there is provided according to the present invention a process or producing the resin composition comprising the steps of melt kneading the polycarbonate resin (A) and the compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group; and continuing the melt kneading after adding at least one component selected from the group consisting of the polycarbonate resin (A), the polyolefin resin (B), and the polyolefin resin (C) that has been modified with at least one functional group selected from the group consisting of epoxy, carboxyl, and an acid anhydride groups in an arbitrary order.

Still further, there is provided according to the present invention a resin composition wherein the modified polyolefin resin (C) is the polyolefin resin modified with at least one functional group selected from the group consisting of carboxyl and an acid anhydride groups; and the resin composition has been produced through reaction of the modified polyolefin resin (C) with the compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group, whereby a linkage represented by formula (H):

is produced.

Still further, there is provided according to the present invention a resin composition wherein the modified polyolefin resin (C) is the polyolefin resin modified with epoxy group; and the resin composition has been produced through reaction of the modified polyolefin resin (C) with the compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group, whereby a linkage represented by formula (J):

is produced.

According to one embodiment of the present invention, there is provided a polycarbonate/polyolefin based resin composition comprising 40 to 99% by weight of polycarbonate resin (A);

60 to 0% by weight of polyolefin resin (B);

0.5 to 60% by weight of polyolefin resin (C) that has been modified with at least one functional group selected from the group consisting of epoxy, carboxyl, and an acid anhydride groups; and 0.05 to 5% by weight of compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group.

According to another embodiment of the present invention, there is provided a process for producing such a polycarbonate/polyolefin based resin composition by melt kneading the components (A) to (D).

According to a further embodiment of the present invention, there is provided a polycarbonate/polyolefin based resin composition comprising 40 to 99% by weight of polycarbonate resin (A);

60 to 0% by weight of polyolefin resin (B);

0.5 to 60% by weight of polyolefin resin (C) that has been modified with at least one functional group selected from the group consisting of epoxy, carboxyl, and an acid anhydride groups;

0.05 to 5% by weight of compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group; and 0.1 to 30% by weight of styrene copolymer (E)

According to a further embodiment of the present invention, there is provided a process for producing such a polycarbonate/polyolefin based resin composition by melt kneading the components (A) to (E).

According to a still further embodiment of the present invention, there is provided a process for producing a polycarbonate/polyolefin based resin composition comprising the steps of (1) reacting 100 parts by weight of a polyolefin resin that has been modified with at least one functional group selected from the group consisting of epoxy, carboxyl, and an acid anhydride groups with 0.05 to 5% by weight of compound represented by the formula: HOOC—R—NH$_2$ wherein R represents at least one member selected from the group consisting of an alkene group, an alkylidene group, and an oligomethylene group containing 5 or more carbon atoms, and optionally substituted phenylene and naphthylene groups in a melt kneading machine at a temperature in the range of from 180° to 340° C. to produce a polyolefin resin that has been modified with the compound represented by the formula: HOOC—R—NH$_2$; and (2) melt kneading 2 to 40 parts by weight of the modified polyolefin resin produced in step (1) with 60 to 99 parts by weight of a polycarbonate resin having a melt index of from 1 to 30 at a temperature of from 220° to 340° C.

According to a still further embodiment of the present invention, there is provided a process for producing a polycarbonate/polyolefin based resin composition comprising the steps of (1) reacting 100 parts by weight of a polyolefin resin that has been modified with at least one functional group selected from the group consisting of epoxy, carboxyl, and an acid anhydride groups with 0.05 to 5by weight of compound represented by the formula: HOOC—R—NH$_2$ wherein R represents at least one member selected from The group consisting of an alkene group, an alkylidene group, and an oligomethylene group containing 5 or lore carbon atoms, and optionally substituted phenylene and naphthylene groups in a melt kneading machine at a temperature in the range of from 180° to 340° C. to produce a polyolefin resin that has been modified with the compound represented by the formula: HOOC—R—NH$_2$; and (2) melt kneading 2 to 40 parts by weight of the modified polyolefin resin produced in step (1) with more than 0 to 20 parts by weight of a polyolefin resin and 60 to 99 parts by weight of a polycarbonate resin having a melt index of from 1 to 30 at a temperature of from 220° to 340° C.

According to a still further embodiment of the present invention, there is provided a glass fiber-reinforced polycarbonate resin composition comprising 95 to 60 parts by weight of a polycarbonate resin composition produced by melt kneading 99 to 85 parts by weight of polycarbonate resin (A);

1 to 15 parts by weight or polyethylene resin (c) that has been modified with at least one functional group selected from the group consisting of an acid, an acid anhydride, and epoxy groups; and 0.005 to 2.0 parts by weight of compound (D) represented by the formula: HOOC—R—N$_2$ wherein R represents at least one member selected from the group consisting of an alkylidene group and an alkene group containing 5 or more carbon atoms, and phenylene group and naphthylene group that are optionally substituted with an alkyl group; and 5 to 40 parts by weight of glass fiber.

In this embodiment, the modified polyethylene is at least one member selected from the group consisting of straight-chain low density polyethylene modified with maleic anhydride, low density polyethylene modified with maleic anhydride, and high density polyethylene modified with maleic anhydride.

According to a still further embodiment of the present invention, there is provided a molded article produced by melt molding such glass fiber-reinforced polycarbonate resin composition.

DETAILED DESCRIPTION OF THE INVENTION

Figure 1:
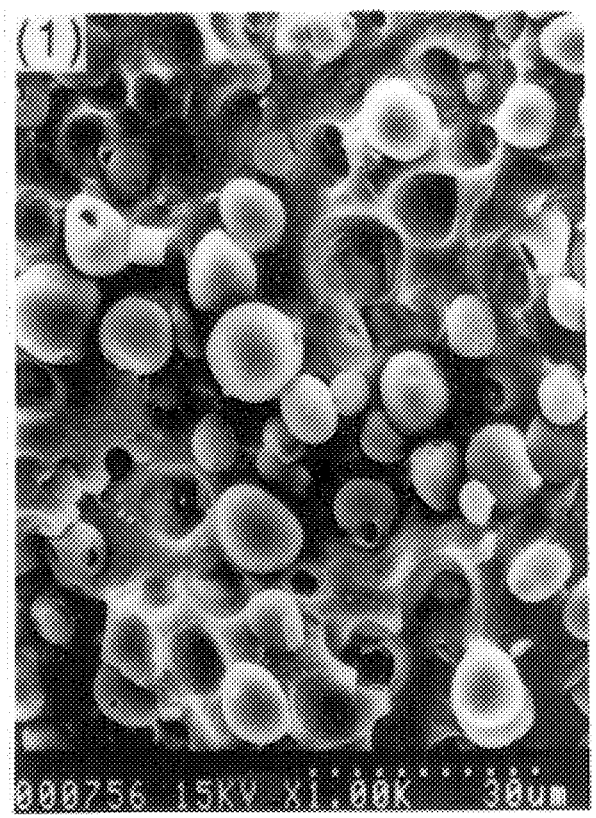
FIG. 1 is an electron microscope photograph of a particle structure showing the dispersion of constituent components of a composition comprising PC (70 wt %) and polypropylene (30 wt %)

[1] According to the first aspect of the present invention whereby the above-described first object of the present invention is attained, there is provided resin compositions of the following three embodiments.

The resin composition according to the first embodiment is:
  a polycarbonate/polyolefin based resin composition exhibiting an improved polycarbonate/polyolefin compatibility prepared by melt kneading
  (A) a polycarbonate resin;
  (C) a polyolefin resin that has been modified with at least one functional group selected from the group consisting of epoxy, carboxyl, and an acid anhydride groups; and
  (D) a compound represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group.

The resin composition according to the second embodiment is:
  a polycarbonate/polyolefin based resin composition exhibiting an improved polycarbonate/polyolefin compatibility prepared by melt kneading
  (A) a polycarbonate resin;
  (B) a polyolefin resin;
  (C) a polyolefin resin that has been modified with at least one functional group selected from the group consisting of epoxy, carboxyl, and an acid anhydride groups; and
  (D) a compound represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group.

The resin composition according to the third embodiment is:
  a polycarbonate/polyolefin based resin composition exhibiting an improved polycarbonate/polyolefin compatibility prepared by melt kneading
  (A) a polycarbonate resin;
  (B) a polyolefin resin;
  (C) a polyolefin resin that has been modified with at least one functional group selected from the group consisting of epoxy, carboxyl, and an acid anhydride groups;
  (D) a compound represented by the formula: HOOC—R—NH$_2$ wherein B represents at least one member selected from the group consisting of an alkene group, an alkylidene group, and an oligomethylene group containing 5 or more carbon atoms, and phenylene group and naphthylene group optionally substituted with an alkyl group; and
  (E) a styrene copolymer resin.

[1–3] Components (A) to (E) used for the starting materials in producing the polycarbonate/polyolefin based resin compositions of the present invention are described below.

(A) Polycarbonate resin

The polycarbonate resin which may be used in the present invention is a thermoplastic aromatic polycarbonate polymer produced by reacting an aromatic hydroxy compound and an optional small amount of polyhydroxy compound with phosgen, carbonic acid, or a carbonate diester. Exemplary aromatic dihydroxy compounds include 2,2-bis(4-hydroxy-phenyl)propane (bisphenol A), tetramethylbisphenol A, tetrabromobisphenol A, bis(4-hydroxyphenyl)-p-diisopropyl-benzene, hydroquinone, resorcinol, 4,4'-dihydroxydiphenyl, bis(4-hydroxyphenyl)sulfide, bis(4-hydroxyphenyl)ketone, 1,1-bis(4-hydroxyphenyl)ethane, 1,1-bis(4-hydroxyphenyl)-cyclohexane, among which the bisphenol A being the preferred in view of the heat resistance, mechanical strength, and molding properties. Such dihydroxy compound may be used either alone or in combination of two or more. Preferred combinations of two or more dihydroxy compounds include bisphenol A with tetramethylbisphenol A; and bisphenol A with tetrabromo-bisohenol A.

The polycarbonate resin used in the present invention may preferably have a melt index in the range of from 1 to 30, and more preferably, from 4 to 20. Use of a polycarbonate resin with a melt index of less than 1 may result in poor molding properties, while an excessively high melt index may result in a reduced impact strength of the resulting product.

The polycarbonate resin used in the present invention may contain a crystalline or non-crystalline thermoplastic resin such as polyethylene terephthalate, polybutylene terephthalate, bisphenol polyarylate, 6,6-Nylon, 6-Nylon, 6,10-Nylon or the like in an amount that would not adversely affect the merits of the present invention, preferably in an amount of up to 20% by weight, and more preferably in an amount of up to 10% by weight. incorporation of a crystalline resin will result in an improved chemical resistance, and incorporation of a non-crystalline resin will result in an improved heat resistance.

The resin composition of the present invention may contain such polycarbonate resin preferably in an amount of from 40 to 99% by weight, and more preferably from 60 to 95% by weight, and most preferably from 80 to 95% by weight. An excessively low content of the polycarbonate resin will result in poor heat resistance and impact strength of the resin composition, whereas an excessively large content of the polycarbonate resin will result in poor workability upon molding. The molecular weight of the polycarbonate resin is not limited to any particular range. However, the polycarbonate resin may preferably have a number average molecular weight of from 1,000 to 100,000, and more preferably, from 5,000 to 40,000 calculated in terms of polystyrene. The molecular weight lower than such range may adversely affect the impact strength and other physical properties of the resin composition, while the molecular weight larger than such range will result in deteriorated workability upon molding. However, when the polycarbonate resin is used for the purpose of improving the heat resistance, rigidity, and flame retardancy of the polyolefin resin, the content of the polycarbonate resin may be not necessarily exceed 40% by weight.

(B) Polyolefin resin

The polyolefin resins which may be used in the present invention include crystalline polypropylene, crystalline propylene-ethylene block or random copolymer, low density polyethylene, high density polyethylene, linear low density polyethylene, ultra-high molecular weight polyethylene, ethylene-propylene random copolymer, ethylene-propylene-diene copolymer, and the like. Among such polyolefin resins, the preferred are the crystalline polypropylene, the crystalline propylene-ethylene copolymer, the low density polyethylene, the high density polyethylene, the linear low density polyethylene, and the ultra-high molecular weight polyethylene.

The resin composition of the present invention may contain the polyolefin resin preferably in an amount of from 60 to 0% by weight, more preferably from 60 to 0.1% by weight, still more preferably from 50 to 3% by weight, and most preferably from 20 to 3% by weight. An excessively large content of the polycarbonate resin will result in reduced heat resistance. The melt index of the polyolefin resin is not limited to any particular range. However, the polyolefin resin may preferably have a melt index (at 230° C., under a load of 2.16 kg) of from 0.1 to 70 g/10 min., and more preferably, from 0.5 to 30 g/10 min. The melt index lower than such range will result in deteriorated molding Workability, whereas the melt index higher than such range will result in poor physical properties, in particular, poor impact strength of the resin composition. However, when the resin composition is provided for the purpose of improving the heat resistance, rigidity, and flame retardancy of the polyolefin resin, the content of the polyolefin resin may exceed 60% by weight of the resin composition.

(C) Polyolefin resin modified With at least one functional group selected from the group consisting of epoxy, carboxyl, and an acid anhydride groups The modified polyolefin resin used in the present invention is not limited to any particular species, and it may be any polyolefin resin described in the above (B) to which an unsaturated monomer containing epoxy, carboxyl, or an acid anhydride group is copolymerized.

Exemplary epoxy-containing unsaturated monomers include glycidyl methacrylate, butylglycidyl malate, butylglycidyl fumarate, propylglycidyl malate, glycidyl acrylate, N-[4-(2,3-epoxypropoxy)-3,5-dimethylbenzyl]-acrylamide, and the like. Among these, the preferred are glycidyl methacrylate and N-[4-(2,3-epoxypropoxy)-3,5-dimethylbenzyl] acrylamide in view of their price and availability.

Exemplary carboxyl-containing unsaturated monomers include acrylic acid, methacrylic acid, maleic acid, and the like. Exemplary unsaturated monomers containing an acid anhydride group are maleic anhydride, itaconic anhydride, citraconic anhydride, and the like. Among these, acrylic acid and maleic anhydride are the preferred in view of their reactivity and availability.

The unsaturated monomer containing epoxy, carboxyl, or an acid anhydride group may be copolymerized with the polyolefin resin by any desired means. Exemplary means include melt kneading of the polyolefin resin and the unsaturated monomer in a twin screw extruder, a Banbury mixer, a kneader or the like in the presence or absence of a radical initiator, and copolymerization by the copresence of the monomer constituting the polyolefin with the unsaturated monomer containing epoxy, carboxyl, or acid anhydride. The content of the unsaturated monomer is in the range of from 0.01 to 10% by weight, and preferably, from 0.1 to 5% by weight of the modified polyolefin resin. The content of the unsaturated monomer lower than such range is insufficient to improve the delamination resistance of the resulting resin composition, and the content in excess of such range will adversely affect such properties as long-term heat resistance.

The content of the polyolefin resin modified with epoxy, carboxyl, or an acid anhydride group is preferably in the range of from 0.5 to 60% by weight, more preferably, from 0.5 to 30% by weight, and most preferably, from 0.5 to 20% by weight of the resin composition of the present invention. The content of the modified polyolefin resin lower than such range will result in a reduced polycarbonate/polyolefin compatibility of the resulting resin composition, leading to susceptibility for delamination. The content in excess of such range will adversely affect such properties as heat resistance. However, when the resin composition is provided for the purpose of improving the heat resistance, rigidity, and flame retardancy of the polyolefin resin, the content of the modified polyolefin resin may exceed 60% by weight of the resin composition.

(D) Compound represented by at formula: HOOC—R—$NH_2$

In the compound represented by the formula: HOOC—R—$NH_2$ used in the present invention, R represents a structural unit selected from an alkene group, an alkylidene group, and an oligomethylene group containing 5 or more carbon atoms, and phenylene group and naphthylene group. Upper limit in the number of carbon atoms contained in such compound is not limited to any particular number. However, such compound may preferably contain up to 20 carbon atoms, and more preferably, up to 12 carbon atoms. The compound containing an excessively large number of carbon atoms is difficult to obtain in an industrial scale, and will result in poor heat resistance of the resulting compound. The alkylidene group may be linear, branched or alicyclic. The phenylene group may be p-phenylene, m-phenylene, or o-phenylene. The naphthylene group may be 2,6-naphthylene group, 2,7-naphthylene group, 1,5-naphthylene group, 1,8-naphthylene group, or 4,4'-diphenylene group. The phenylene group and the naphthylene group may be optionally substituted with an alkyl group, carboxyl group, a halide, amino group, and an alkoxy group.

Exemplary such compounds include 6-aminocaproic acid, 7-aminoheptanoic acid, 8-aminooitanoic acid, 11-aminoundecanoic acid, p-aminobenzoic acid, m-aminobenzoic acid, 2-amino-6-naphthalenecarboxylic acid, 2-amino-7-naphthalenecarboxylic acid.

The content of the compound represented by the formula: HOOC—R—$NH_2$ may be in the range of from 0.05 to 5% by weight, preferably from 0.05 to 4% by weight, and more preferably, from 0.05 to 2% by weight of the resin composition of the present invention. An excessively low content of such compound will result in an insufficient compatibility of the resin components, and hence, in delamination. An excessively large content of such compound will particularly result in the reduced molecular weight of the polycarbonate component, leading to the poor impact strength of the resulting composition.

(E) Styrene copolymer

The styrene copolymer used in the present invention may be a copolymer of styrene with an olefin or butadiene, which is either a block, a graft, or an alternating copolymer. Exemplary block copolymers include styrene-ethylene/propylene copolymer, styrene-butadiene-styrene copolymer, styrene-ethylene/butylene-styrene copolymer, and the like. Exemplary grafted copolymers include polystyrene-grafted polypropylene, polystyrene/polyacrylo-nitrile-grafted polypropylene, polystyrene-grafted low density polyethylene, polystyrene/polyacrylonitrile-grafted low density polyethylene, and the like. Exemplary alternating copolymers include styrene-butadiene copolymer and the like.

The content of the styrene copolymer is in the range of from 0.1 to 30% by weight, and preferably, from 0.5 to 10% by weight. When the content of the styrene copolymer is lower than such range, effect of the addition would not be significant, and when the content is in excess of such range, heat resistance and flexural rigidity of the resulting resin would be reduced.

The resin composition of the present invention may include various components other than the above-described components in an amount would not interfere with the merits of the present invention. Exemplary such additional components that may be added include other thermoplastic and non-thermoplastic resin components, elastomers, pigments, organic and inorganic fillers, and the like. Examples of the thermoplastic resins are polyethylene terephthalate, polybutylene terephthalate, Nylon, modified PPO, polystyrene, liquid crystal resin, Teflon, and the like. Examples of the resin components that are not thermoplastic are silicone oil, and the like. Examples of the inorganic fillers are alamid fiber, carbon fiber, talc, mica, calcium carbonate, potassium titanate whisker, and the like. The resin composition of the present invention may further comprise a flame retardant, a plasticizer, an antioxidant, or other additives that are generally added to a thermoplastic resin. Such additives may be used in appropriate amounts.

[1–2] The resin composition comprising (A), (C) and (D) according to the first embodiment exhibits an improved polycarbonate/polyolefin compatibility, and therefore, the properties inherent to the polycarbonate can be readily balanced with the properties inherent to the polyolefin. The product produced therefrom exhibits reduced delamination.

[1–3] The resin composition comprising (A), (B), (C) and (D) according to the second embodiment has excellent heat resistance, mechanical strength, and surface properties (no delamination).

[1–4] The resin composition comprising (A), (B), (C), (D) and (E) according to the third embodiment has excellent heat resistance, mechanical strength, and surface properties (improved delamination resistance) comparable to those of the resin composition according to the second embodiment, as well as improved impact resistance and molding properties.

[1–5] The favorable resin composition according to the present invention that comprises component (A) in an amount of preferably from 40 to 99% by weight, more preferably from 60 to 95% by weight, and most preferably from 80 to 95% by weight;

component (B) in an amount of preferably from 60 to 0% by weight, more preferably from 50 to 0.1% by weight, still more preferably from 50 to 3% by weight, and most preferably from 20 to 3% by weight;

component (C) in an amount of preferably from 0.5 to 60% by weight, more preferably from 0.5 to 30% by weight, and most preferably from 0.5 to 20% by weight; and component (D) in an amount of preferably from 0.05 to 5% by weight, more preferably from 0.05 to 4% by weight, and most preferably from 0.05 to 2% by weight; has well balanced mechanical strength, heat resistance, wear resistant properties, and solvent resistance.

Such resin composition may further comprise optional component (E) in an amount of preferably from 0.1 to 30% by weight, more preferably from 0.5 to 10% by weight, and most preferably from 0.5 to 5% by weight.

The favorable resin composition according to the present invention that comprises component (A) in an amount of preferably from 1 to 99% by weight, more preferably from 1 to 60% by weight, and most preferably from 3 to 20% by weight;

component (B) in an amount of preferably from 98 to 0% by weight, more preferably from 90 to 0% by weight, and most preferably from 10 to 0% by weight;

component (C) in an amount of preferably from 0.5 to 99% by weight, more preferably from 10 to 95% by weight, and most preferably from 20 to 90% by weight; and component (D) in an amount of preferably from 0.05 to 5% by weight, more preferably from 0.05 to 4% by weight, and most preferably from 0.05 to 2% by weight; has highly improved solvent resistance.

Such resin composition may further comprise optional component (E) in an amount of preferably from 0.1 to 30% by weight, more preferably from 0.5 to 10% by weight, and most preferably from 0.5 to 5% by weight.

[2] According to the second aspect of the present invention whereby the above-described second object of the present invention is attained, there is provided processes for producing resin compositions according to the first aspect of the present invention.

The components (A) to (E) used in such processes have been described in the above [1]. The processes for producing resin compositions of the present invention are characterized in that the process advances via the reaction stages of production of a precursor of a compatibilizer for the polycarbonate resin (A) and the polyolefin resin (B) by melt kneading; and production of the compatibilizer for the polycarbonate resin (A) and the polyolefin resin (B) by melt kneading of the precursor with the polycarbonate resin (A). The latter reaction stage wherein the compatibilizer is produced may be carried out either subsequent to or simultaneously with the former reaction stage wherein the compatibilizer precursor is produced. It is also possible to simultaneously conduct the production of the compatibilizer precursor and the production of the compatibilizer in the course of the production of the resin composition of the present invention. The compatibilizer precursor and the compatibilizer will be described later.

More illustratively, when the modified polyolefin resin (C) used is the polyolefin resin modified with at least one functional group selected from the group consisting of carboxyl and an acid anhydride groups, the process of the present invention advances through the reaction stages of reaction of the carboxyl- or acid anhydride-modified polyolefin resin (C) with the compound (D) represented by the formula: HOOC—R—NH$_2$, in which the linkage represented by formula (H):

having the functional moiety (H) is formed; and reaction of such moiety (H) with the polycarbonate resin (A).

When the modified polyolefin resin (C) used is the polyolefin resin modified with epoxy group, the process of the present invention advances through the reaction stages of reaction of the epoxy-modified polyolefin resin (C) with the compound (D) represented by the formula: HOOC—R—NH$_2$, in which the linkage represented by formula (J):

having the functional moiety (J) is formed; and reaction of such moiety (J) with the polycarbonate resin (A).

Accordingly, in the production of the resin compositions of the present invention, the precursor of the compatibilizer for the polycarbonate resin (A) and the polyolefin resin (B); and the compatibilizer formed from such compatibilizer precursor are formed as intermediates, whose definitions are given below. Production of the resin composition of the present invention through formation of functional moiety (H) Is preferred in view of the minimized unfavorable side reaction.

Precursor of the Compatibilizer for the Polycarbonate Resin (A) and the Polyolefin Resin (B)

The compatibilizer precursor is produced through the reaction of (C) a polyolefin resin that has been modified with at least one functional group selected from the group consisting of epoxy, carboxyl, and an acid anhydride groups; and (D) a compound represented by the formula: HOOC—R—NH2 wherein R represents at least one member selected from the group consisting of an alkene group, an alkylidene group, and an oligomethylene group containing 5 or more carbon atoms, and phenylene group and naphthylene group optionally substituted with an alkyl group.

Compatibilizer for the Polycarbonate Resin (A) and the Polyolefin Resin (B)

The compatibilizer is produced through the reaction of (A) a polycarbonate resin;

(C) a polyolefin resin that has been modified with at least one functional group selected from the group consisting of epoxy, carboxyl, and an acid anhydride groups; and (D) a compound represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group.

Since such intermediates are formed in the melt kneading of the starting materials, the resin composition of the present invention would undergo a sufficient polymer alloying to exhibit improved compatibility, as if the polycarbonate resin and the polyolefin resin had undergone graft polymerization. Such reaction can be promoted simultaneously with the mixing of various starting materials in a twin screw extruder through so called reactive processing. Production efficiency of a quite high level is thereby attained.

The reason for the compatibility of the compatibilizer produced in the present invention to serve an efficient compatibilizer for the polycarbonate and the polyolefin is estimated as follows.

The —NH$_2$ group in the component (D) reacts with the carboxyl group or the acid anhydride group in the component (C) to form amide bond, or alternatively, with the epoxy group in the component (C) to form amino bond, and the component (D) would then become added to the component (C) and the carboxyl group in the component (D) would become incorporated into the component (C) with the intervening amide or amino bond. The carboxyl group in the component (D) that has been incorporated into the component (C) then reacts with the carboxyl group in the component (A), and then, a polycarbonate-grafted polyolefin wherein the polycarbonate (A) and the component (C) are linked by ester bond; polycarbonate having terminal hydroxyl group; and CO$_2$ are formed by decomposition. The thus formed polycarbonate-grafted polyolefin has the polycarbonate moiety and the polyolefin moiety within its molecule, and therefore, the polycarbonate-grafted polyolefin may serve an effective compatibilizer for the polycarbonate/polyolefin-based resin composition.

The compatibilizer of the highest effectivity may be obtained by reacting a stoichiometric amount of the component (C) in terms of its functional groups, the component (D) and the component (A), and by using the component (A) and the polyolefin in the component (C) of higher polymerization degrees.

In the production of the resin compositions of the present invention, melt kneading of the starting materials to promote the polymer alloying may be carried out with a single screw extruder, a twin screw extruder, kneader, Brabender, or the like. Use of a twin screw extruder is preferable for the efficiency of the alloying. The reaction, namely, the melt kneading may preferably be carried out at a temperature in the range of from 265° to 380° C., and more preferably, from 270° to 340° C.

The melt kneading temperature of lower than 265° C. is insufficient to promote sufficient compatibilization between the polycarbonate resin and the polyolefin resin, and the resulting resin composition would be susceptible for delamination upon molding. The melt kneading temperature of higher than 380° C. would result in thermal decomposition of the resin composition, and the resulting product would exhibit poor mechanical properties.

If desired, some of the starting materials may be preliminarily melt kneaded before the addition to the melt kneader of the remaining starting materials. For example, a portion of the polycarbonate resin (A) and the compound (D) represented by the formula: HOOC—R—NH$_2$ may be preliminarily melt kneaded before the addition of the remaining starting materials. In such case, the compatibilizer precursor would be formed during the preliminary melt kneading, and in the subsequent melt kneading, such compatibilizer precursor converted into the compatibilizer would be blended with the polycarbonate resin (A) and the optional styrene copolymer (E) to form the matrix of the resulting resin composition, in which the polyolefin resin is dispersed in micro particulate composite. The polyolefin particles may preferably have a microscopically determined average particle size in one range of from 0.1 $\mu$m to 5 $\mu$m, and an average aspect ratio (major axis/minor axis) of up to 5.

Next, the reaction stages characteristic to the present invention are described.

(1) The step wherein the polyolefin resin (C) that has been modified with at least one functional group selected from the group consisting of epoxy, carboxyl, and an acid anhydride groups is modified by the compound (D) represented by the formula: HOOC—R—NH$_2$ to produce the precursor for the polycarbonate/polyolefin compatibilizer.

In this step, 100% by weight of the polyolefin resin (C) that has been modified with at least one functional group selected from the group consisting of epoxy, carboxyl, and an acid anhydride groups is uniformly mixed with the compound (D) represented by the formula: HOOC—R—NH$_2$ preferably used in an amount of from 0.05 to 5% by weight in Henschel mixer, and the mixture is fed to a melt kneader such as a twin screw extruder or a kneader machine wherein the mixture is melt kneaded at a temperature preferably in the range of from 180° to 340° C.

When the amount of the compound (D) represented by the formula: HOOC—R—NH$_2$ is less than 0.05% by weight, the improvement in the polycarbonate/polyolefin compatibility would be insufficient. Amount of the compound (D) excess of 5% by weight would adversely affect the heat resistance of the resulting product. The reaction temperature (kneading temperature) below the above-specified range would result in an excessively low reaction rate, and hence, in an insufficient reaction, while the reaction temperature in excess of such range would result in significant deterioration of the resin composition to result in significantly poor physical properties or the resulting product.

(2) The step wherein the polycarbonate/polyolefin compatibilizer precursor produced in step (1) is melt kneaded with the polycarbonate resin, and optionally, with the polyolefin resin.

In this step, the HOOC—R—NH$_2$—modified polyolefin resin produced in step (1) preferably in an amount of from 2 to 40% by weight; the polyolefin resin preferably in an amount of from 0 to 20% by weight; and the polycarbonate resin preferably in an amount of from 60 to 99% by weight are preliminarily mixed in Henschel mixer to form a uniform mixture, and the resulting mixture is fed to a twin screw extruder, a kneader machine, or the like wherein the mixture is melt kneaded at a temperature preferably in tee range of from 220° to 340° C.

When the amount of the compatibilizer precursor blended is less than the above-specified range, the compatibility would not be sufficiently improved. On the other hand, an excessively large amount of the compatibilizer precursor would adversely affect the heat resistance of the resulting product. The amount used of the polycarbonate resin less than the above-specified range would result in poor heat resistance of the resulting product, while excessive use of the polycarbonate resin would result in poor organic solvent resistance. The kneading temperature below the above-specified range would result in an insufficient melting of the resin components to interfere with the uniform dispersion of the components, while the kneading temperature in excess or such range would result in significant deterioration of the resin composition to result in significantly poor physical properties of the resulting product.

The processes for producing the resin compositions of the present invention according to the second aspect of the present invention include the following seven embodiments.

[2-1] In the production process according to the first embodiment, the resin composition is produced by melt kneading the predetermined amounts of the components (A) to (D) and the optional component (E).

The resin production by such procedure is simple, and therefore, favorable in view of the low production cost.

[2—2] In the production process according to the second embodiment, the resin composition is produced by melt kneading the compatibilizer precursor as describe above with the polycarbonate resin (A).

The resin production by such procedure has the merit of a suppressed decomposition of the polycarbonate resin, and the resulting product would have an improved impact strength.

[2-3] In the production process according to the third embodiment, the resin composition is produced by melt kneading the compatibilizer precursor as described above with the polycarbonate resin (A.), the polyolefin resin (B) and the styrene copolymer resin (E) simultaneously or sequentially in an arbitrary order.

Production of the resin composition by such procedure is convenient for regulating the polycarbonate/polyolefin compatibility, and hence, for regulating the properties of the resulting product.

[2-4] In the production process according to the fourth embodiment, the resin composition is produced by melt kneading the compatibilizer as described above with the polycarbonate resin (A).

Production of the resin composition by such procedure is also convenient for regulating the polycarbonate/-polyolefin compatibility, and hence, for regulating the properties of the resulting product.

[2-5] In the production process according to the fifth embodiment, the resin composition is produced by melt kneading the compatibilizer as described above with the polycarbonate resin (A), the polyolefin resin (B) and the styrene copolymer resin (E) simultaneously or sequentially in an arbitrary order.

Production of the resin composition by such procedure is also convenient for regulating the polycarbonate/polyolefin compatibility, and hence, for regulating the properties of the resulting product.

[2-6] In the production process according to the sixth embodiment, the resin composition is produced by melt kneading the polyolefin resin (B), an acid anhydride, and the compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group; and continuing the melt kneading after adding the polycarbonate resin (A) and the styrene copolymer resin (E) simultaneously or sequentially in an arbitrary order.

The resin production by such procedure has the merit of a suppressed decomposition of the polycarbonate resin, and the resulting product would have an improved impact strength.

[2-7] In the production process according to the seventh embodiment, the resin composition is produced by melt kneading the polycarbonate resin (A) and the compound (D) represented by the formula: HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group; and continuing the melt kneading after adding at least one component selected from the group consisting of the polycarbonate resin (A), the polyolefin resin (B), and the polyolefin resin (C) that has been modified with at least one functional group selected from the group consisting of epoxy, carboxyl, and an acid anhydride groups in an arbitrary order.

The resin production by such procedure has the merit of an improved polycarbonate/polyolefin compatibility, and the resulting product would exhibit an improved resistance to delamination.

The resin compositions of the present invention may be molded into desired products by any of the conventional procedures used in molding thermoplastic resins, for example, injection molding, blow molding, sheet forming, laminate molding, and stamping, among which the injection molding being preferred.

When the process for producing the resin composition of the present invention is employed, a polycarbonate/ polyolefin based resin composition with excellent heat resistance, mechanical strength, and appearance (with no delamination) may be produced from readily available starting materials at a high production efficiency. Such excellent physical and surface properties may be attributed to the improved polycarbonate/polyolefin compatibility through chemical reaction between the components (C) and (D). The improved polycarbonate/polyolefin compatibility through chemical reaction between the components (C) and (D) is manifested by the microphotographs of the cross section, as will be described later.

[3] According to the third aspect of the present invention whereby the above-described third object of the present invention is attained, there is provided molded materials wish improved wear resistant properties.

Such molded materials are produced by melt molding the resin compositions according to the first aspect of the present invention described in the above [1]. The molded materials with improved wear resistant properties according to this aspect of the invention also has excellent heat resistance, mechanical properties, and flame retardancy, and may be produced in an inexpensive manner.

The resin composition employed for the production is not particularly limited. Preferable resin composition employed comprises 99 to 85% by weight, and preferably, 98 to 90% by weight of the polycarbonate (A);

1 to 15% by weight, and preferably, 2 to 10% by weight of the modified polyolefin (C); and 0.05 to 2% by weight, and preferably, 0.1 to 2% by weight of the compound (D) represented by the formula: HOOC—R—NH$_2$.

The resin composition may further comprise the polyolefin (B) preferably in an amount of from 1 to 5% by weight in addition to the component (A), (C) and (D). The component (B) contributes for the improvement in the molding properties of the resin composition.

If desired, the resin composition may further comprise the styrene copolymer resin (E) preferably in an amount of from 1 to 5% by weight. The component (E) contributes for the improvement in the impact strength of the molded material.

The polycarbonate/polyolefin based resin composition employed for producing the molded material with improved wear resistant properties may be produced by blending the polycarbonate (A), the modified polyolefin (C); and the compound (D) represented by the formula: HOOC—R—NH$_2$ in the blending ratio of:

99 to 85% by weight of (A);
1 to 15% by weight of (C); and
0.05 to 2% by weight (D);

Preferable blending ratio is:
98 to 90% by weight of (A);
2 to 10% by weight of (C); and
0.1 to 1% by weight of (D).

The most preferable blending ratio is
93 to 97% by weight of (A);
3 to 7% by weight of (C); and
0.2 to 1.0% by weight of (D).

When the content of the polycarbonate resin (A) exceeds 99% by weight, the content of the modified polyolefin (C) would be reduced to result in poor wear resistant properties. When the content of the modified polyolefin (C) exceeds 15% by weight, the resulting resin composition would exhibit somewhat reduced polycarbonate/polyolefin compatibility as well as poor heat resistance. The content of the compound (D) of less than 0.05% by weight would result in insufficient wear resistant properties, while the content in excess of 2 by weight would induce a reaction between the compound (D) and the polycarbonate to particularly result in the reduced molecular weight of the polycarbonate. Such reduction in the molecular weight of the polycarbonate component would invite reduced impact strength of the resulting product.

The modified polyolefin (C) may preferably be a modified polyethylene.

The modified polyethylene used in this aspect of the invention is not limited to any particular species so long as the modified polyethylene is high density polyethylene, low density polyethylene, straight-chain low density polyethylene, or the like having copolymerized therewith an unsaturated monomer containing an acid, an acid anhydride, or epoxy group. Exemplary unsaturated monomers containing an acid include acrylic acid, methacrylic acid, maleic acid, cyclohexenedicarboxylic acid, and the like. Exemplary acid anhydride groups include maleic anhydride, itaconic anhydride, citraconic anhydride, cyclohexenedicarboxylic anhydride, and the like. Exemplary preferable epoxy-containing unsaturated monomers include glycidyl methacrylate, butylglycidyl malate, butylglycidyl fumarate, propylglycidyl malate, glycidyl acrylate, N-[4-(2,3-epoxypropoxy)-3,5-dimethylbenzyl]acrylamide, and the like.

The unsaturated monomer containing an acid, an acid anhydride, or epoxy group may be copolymerized with the high density polyethylene, the low density polyethylene, the straight-chain low density polyethylene, or the like by any desired means. Exemplary means include melt kneading of the polyethylene resin with the unsaturated monomer in a twin screw extruder, a Banbury mixer, a kneading machine, or the like in the presence or absence of a radical initiator, and copolymerization by the copresence of the monomer constituting the polyethylene with the unsaturated monomer containing epoxy, carboxyl, or acid anhydride.

Preferably, the acid, the acid anhydride, or the epoxy group may be present at a content in the range of from 0.01 to 10% by weight of the polyethylene resin. A content lower than such range would result in insufficient wear resistant properties of the resulting product, and a content in excess of such range would induce such problems as coloring of the material. The content of the polyethylene resin modified with an acid, an acid anhydride or epoxy group is in the range of from 1 to 15% by weight, preferably from 2 to 10% by weight, and more preferably, from 3 to 7% by weight of the resin composition of the present invention. A content of the modified polyethylene resin lower than such range will result in insufficient wear resistant properties, whereas a content in excess of such range will result in a reduced resistance to delamination.

The polyethylene used in producing the modified polyethylene may preferably be straight-chain low density polyethylene, low density polyethylene, or high density polyethylene; and more preferably, straight-chain low density polyethylene or low density polyethylene; and most preferably, straight-chain low density polyethylene. Use of the preferred polyethylene is effective in improving the wear resistant properties of the resulting product.

The modified polyethylene employed is not limited in terms of its molecular weight. However, the modified polyethylene may preferably have a melt index, MI in the range of from 0.1 to 20, and more preferably, from 0.2 to 10. Use of the modified polyethylene with a melt index lower than such range would result in poor molding properties, and use of the modified polyethylene with a melt index in excess of such range would result in insufficient wear resistant properties of the resulting product.

The molded material having improved wear resistant properties according to the third aspect of the present invention may be prepared by blending the structural units as described above in the predetermined amount; melt kneading the mixture to produce the resin composition; and melt molding the resin composition. The thus molded material has excellent wear resistant properties, mechanical strength, and heat resistance in a good balance. The mechanism through which such favorable balanced properties are invited is not definitely found out. However, it is estimated that reaction of the compound (D) represented by the formula: HOOC—R—NH$_2$ with the polycarbonate resin (A) and the modified polyolefin resin (C) has invited the improved compatibility between the polycarbonate resin (A)

and the modified polyolefin resin (C), leading to the improved wear resistant properties and the mechanical strength.

In an exemplary production process, the starting materials may be uniformly mixed in a blender such as Henschel mixer, ribbon blender, or twin-cylinder blender, and the resulting mixture may be melt kneaded in a single or twin screw extruder, a kneader machine, Banbury mixer, Brabender Plasti-Corder, or the like. It is also possible to preliminarily melt knead two of the starting materials, and add the remaining material afterwards. Particularly preferred is the process wherein the modified polyolefin resin (C) and the compound (D) represented by the formula: HOOC—R—NH$_2$ are preliminarily melt kneaded, and the polycarbonate resin (A) is added afterwards. Impact strength of the molded article would be improved by adopting such a process. The improved impact strength is probably attained by inhibition in the molecular weight reduction of the polycarbonate resin (A) caused by the reaction between the modified polyolefin resin (C) and the compound (D) represented by the formula: HOOC—R—NH$_2$.

The molded material according to this aspect of the invention may be prepared by melt molding the above-described resin composition by any of the conventional procedures used in molding thermoplastic resins, for example, injection molding, blow molding, sheet forming, laminate molding, and press molding, among which the injection molding being preferred. The injection molding may be carried out at a melt temperature of from 240° to 360° C. and a mold temperature of from 40° to 130° C.

In the molded material according to this aspect of the present invention, the polyethylene is preferably dispersed in particulate form in the polycarbonate, and the particulate polyethylene present in the region from the material surface to a depth of 20 μm may preferably have an average aspect ratio (major axis/minor axis) of up to 5. When the aspect ratio of the particulate polyolefin is in excess of 5, the resulting product will have insufficient wear resistant properties, probably due to the increased abrasion caused by its laminar, peelable surface structure. The preferable dispersion of the polyethylene in the polycarbonate as described above may be attained when the amount blended of the polycarbonate resin is 90% by weight or more, the modified polyethylene is up to 10% by weight, and the compound (D) represented by the formula: HOOC—R—NH$_2$ is 0.05 to 2.0% by weight. However, the microphase structure may become altered by such factors as molding temperature, injection speed, and cooling rate.

The molded materials according to this aspect of the present invention may further include inorganic fillers such as glass fiber, carbon fiber, alamid fiber, talc, mica, calcium carbonate, and the like at a content that would not adversely affect the merits of the invention. Inclusion of glass fiber, carbon fiber, alamid fiber, or the like is particularly preferred for improving flexural rigidity and wear resistant properties of the resulting product. Inclusion of additives such as silicone oil, ultra-high molecular weight polyethylene powder, unmodified polyethylene, homopolypropylene, polyethylene-polypropylene copolymer, molybdenum compounds, or the like is also preferable for improving the wear resistant properties of the resulting product. The molded material may also contain additives such as a flame retardant, a plasticizer, an antioxidant, and the like that are generally added to a thermoplastic resin, which are used in appropriate amounts.

The molded material according to this aspect of the present invention with improved wear resistant properties may be used for the parts of office automation equipment, household appliance, and medical equipment, and the like. Use for such parts as gear, cum, and bearing is particularly preferred.

[4] According to the fourth aspect of the present invention whereby the above-described fourth object of the present invention is attained, there is provided molded materials with improved solvent resistance.

Such molded materials with improved solvent resistance are produced by melt molding the resin compositions according to the first aspect of the present invention described in the above [1]. The molded materials with improved solvent resistance according to this aspect of the invention also has excellent heat resistance, mechanical properties, and flame retardancy, and may be produced in an inexpensive manner.

The resin composition employed for the production is not particularly limited. The resulting product will have well balanced mechanical strength, heat resistance and solvent resistance when the resin composition comprises 99 to 85% by weight, and preferably, 98 to 90% by weight of the polycarbonate (A);

1 to 15% by weight, and preferably, 2 to 10% by weight of the modified polyolefin (C); and 0.05 to 2% by weight, and preferably, 0.1 to 2% by weight of the compound (D) represented by the formula: HOOC—R—NH$_2$.

The resin composition may further comprise the polyolefin (B) preferably in an amount of from 1 to 5% by weight in addition to the component (A), (C) and (D). The component (B) contributes for the improvement in the molding properties of the resin composition. If desired, the resin composition may further comprise the styrene copolymer resin (E) preferably in an amount of from 1 to 5% by weight. The component (E) contributes for the improvement in the impact strength.

The modified polyolefin (C) used in this aspect of the invention may preferably be polypropylene modified with maleic anhydride, straight-chain low density polyethylene modified with maleic anhydride, low density polyethylene modified with maleic anhydride, or high density polyethylene modified with maleic anhydride in view of their availability at a relatively low price.

The molded material according to this aspect of the present invention may further include inorganic fillers such as glass fiber, carbon fiber, alamid fiber, talc, mica, calcium carbonate, and the like at a content that would not adversely affect the merits of the invention. The molded material may also include an unmodified polyolefin such as homopolypropylene, polyethylene-polypropylene block copolymer, polyethylene-polypropylene random copolymer, high density polyethylene, low density polyethylene, straight-chain low density polyethylene, ultra-high molecular weight polyethylene powder, polymethylpentene, or the like. The molded material may also contain additives such as a flame retardant, a plasticizer, an antioxidant, and the like that are generally added to a thermoplastic resin, which are used in appropriate amounts.

In the molded material with improved solvent resistance according to this aspect of the present invention, the polyolefin is preferably dispersed in the polycarbonate matrix phase in microparticulate phase, and the particulate polyolefin present in the region from the material surface to a depth of 20 μm may preferably have an average particle size in the range of from 0.1 to 3 μm and an average aspect ratio (major axis/minor axis) of up to 5. Such microphase structure results in the mechanical strength and the heat resistance of the material in good balance with the solvent resistance.

The process for producing the resin composition used is not limited to any particular procedure, and use of the procedure described in the above [2–6] is preferred in view of the impact strength of the material.

The process employed for the melt molding is not particularly limited, and injection molding at a melt temperature of from 240° to 360° C. and a mold temperature of from 40° to 130° C. is preferred.

The molded material with improved solvent resistance according to this aspect of the present invention may be used for the parts of office automation equipment, household appliance, and medical equipment, and the like. Use for such parts as gear, cum, and bearing is particularly preferred.

[5] According to the fifth aspect of the present invention whereby the above-described fifth object of the present invention is attained, there is provided a glass fiber-reinforced resin composition comprising the polycarbonate/polyolefin resin composition of the present invention described in the above [1] further comprising a glass fiber (F), and an article molded therefrom.

(F) Glass fiber

The glass fiber used in the present invention is not limited to any particular type. Preferred is use of chopped strand having a fiber length of from about 1 to 10 mm preferably made of an inorganic alkaline glass. Both surface treated and surface untreated glass fibers may be used in the present invention, and use of the glass fiber having its surface treated with a silane compound is preferred. Exemplary silane compound used for the surface treatment include vinyl ethoxvsilane, vinyl trichlorosilane, vinyl tris-($\beta$-methoxyethoxysilane), $\gamma$-glycidoxypropyltrimethoxysilane, $\gamma$-aminopropyltriethoxysilane, $\gamma$-methacryloxypropyltrimethoxysilane, and N-$\beta$-(aminoethyl)-$\gamma$-aminopropyltriethoxysilane, among which the amino silane compounds being preferred. In general, the surface treatment may be carried out by bringing the glass fiber into contact with the silane compound, and such contact treatment may preferably be carried out by using a mixed solvent of a lower alcohol and water.

The content of the glass fiber in the glass fiber-reinforced resin composition of the present invention is in the range of from 5 to 40% by weight, and preferably from 10 to 35% by weight in relation to the content of the polycarbonate/polyolefin-based resin composition in the range of from 95 to 60% by weight. When the content of the glass fiber is less than 5% by weight, the resulting product would have an insufficient flexural rigidity. When the content is in excess of 40% by weight, the resulting product would have a reduced impact strength to become quite brittle.

The glass fiber-reinforced resin composition according to the fifth aspect of the present invention may be produced by blending the predetermined amounts of the polycarbonate/polyolefin-based resin composition as described above and the glass fiber, and the melt kneading the mixture. For example, the polycarbonate resin (A), the modified polyolefin resin (C), the compound (D) represented by the formula: HOOC—R—NH$_2$, and the glass fiber (F) may be uniformly mixed in a blender such as Henschel mixer, ribbon blender, or twin-cylinder blender, and the resulting mixture may be melt kneaded in a single or twin screw extruder, a kneader machine, Banbury mixer, Brabender Plasti-Corder, or the like. It is also possible to preliminarily melt knead few of the starting materials, and add the remaining materials afterwards. Particularly preferred is the process wherein the modified polyolefin resin (C) and the compound (D) represented by the formula: HOOC—R—NH$_2$ are preliminarily melt kneaded, and the polycarbonate resin (A) and the glass fiber (F) are added afterwards. Impact strength of the glass fiber-reinforced resin composition would be improved by adopting such a process. The improved impact strength is probably attained by inhibition in the molecular weight loss of the polycarbonate resin (A) caused by the reaction between the modified polyolefin resin (C) and the compound (D) represented by the formula: HOOC—R—NH$_2$.

The glass fiber-reinforced resin composition as described above may be melt molded into a molded article by any of the conventional procedures used in molding thermoplastic resins, for example, injection molding, blow molding, sheet forming, laminate molding, and press molding, among which the injection molding being preferred.

The thus molded article has excellent wear resistant properties, mechanical strength, and heat resistance in a good balance. The mechanism through which such favorable balanced properties are attained is not definitely found out. However, it is estimated that reaction of the compound (D) represented by the formula: HOOC—R—NH$_2$ with the polycarbonate resin (A) and the modified polyolefin resin (C) has invited the improved compatibility between the polycarbonate resin (A) and the modified polyolefin resin (C), leading to the improved wear resistant properties and the mechanical strength.

The glass fiber-reinforced resin composition or the article molded therefrom according to the fifth aspect of the present invention may further include fillers such as carbon fiber, alamid fiber, talc, mica, calcium carbonate, and the like at a content that would not adversely affect the merits of the invention. Inclusion of carbon fiber, alamid fiber, or the like is particularly preferred in order to improve flexural rigidity and wear resistant properties of the resulting product. Inclusion of additives such as silicone oil, ultra-high molecular weight polyethylene powder, unmodified polyethylene, homopolypropylene, polyethylene-polypropylene copolymer, molybdenum compounds, or the like is also preferable for improving the wear resistant properties of the resulting product. The resin composition or the article molded therefrom may also contain additives such as a flame retardant, a plasticizer, an antioxidant, and the like that are generally added to a thermoplastic resin, which are used in appropriate amounts.

EXAMPLE

The invention is more particularly described by way of examples, which should not be construed as limiting the invention thereto. The starting materials, devices and assessing methods used in the examples are set out below.

Starting Materials (A) Polycarbonate (PC)

Caribre 200-20 (melt index [MI]=20) made by Sumitomo Dow)

Caribre 200-4 (melt index [MI]=4) made by Sumitomo Dow)

(B) Polypropylene (PP)

Noblen W101 (MI=8, homopolymer) made by Sumitomo Chemical Co., Ltd.)

(C) Polyethylene (PE)

Linirex AM0710 (MI=0.3, linear low density polyethylene) made by Nippon Petrochemicals Co., Ltd.)

(D) Modified polyolefins

Maleic anhydride-modified polypropylene AP590P made by Mitsubishi Kasei Corporation Epoxy-modified polypropylene, modified C-900X made by Tonen Corporation Maleic anhydride-modified polyethylene Admer NF300 made by Mitsui Petrochemical Industries, Ltd.

(E) HOOC—R—NH$_2$ 11-aminoundecanoic acid (Aldrich)

(F) Styrene/ethylene/propylene copolymer, Kraton 1701X made by Shell Oil Co.

(G) Ethylene/propylene copolymer, Noblen AH561 made by Sumitomo Chemical Co., Ltd.

Melt kneading

Twin-screw extruder (TEX30HSST) made by The Japan Steel Works, Ltd., with a barrel temperature of 300° C. and an output rate of 10 kg/hour.

Injection molding

Injection molding machine, SAV-60-52, made by Sanjo Seiki Co., Ltd., with a molding temperature of 260° C.

Measurement of physical properties (1) Flexural modulus of elasticity measured at 23° C. by use of Autograph of Shimadzu Corp., according to the method described in ASTM D-740.

(2) Notched impact strength measured according to the method described in ASTM D-256.

(3) Delamination of molded articles evaluated by peel test by bonding a cellophane self-adhesive tape (Cellotape-CT-12S of Nichiban Co., Ltd.) on the surface of a molding sample and pulling it off wherein when if a resin piece was clearly observed on the pulled-off cellophane self-adhesive tape, this sample was evaluated as "x", if a trace resin piece was observed, the sample was evaluated as "Δ" and if no piece was observed, the sample was evaluated as "○."

(4) Heat distortion temperature measured according to the method described in ASTM D-648.

(5) Tensile strength measured according to the method described in ASTM D-638.

(6) Bending strength measured according to the method described in ASTM D-790.

(7) Observation of morphology

The strand obtained after extrusion molding was frozen by means of liquid nitrogen and broken into several pieces, and the section of the thus broken strand was observed through a scanning-type electron microscope.

[1] Firstly, the invention is described by way of examples with respect to a polycarbonate/polyolefin based resin composition exhibiting good miscibility and surface properties according to the first aspect of the invention.

Example 1

800g of PC (Caribre 200-4 of Sumitomo Dow), 200 g of epoxy-modified polypropylene and 48.20 g of 11-aminoundecanoic acid (0.1 mole% based on the polycarbonate) were pre-mixed and supplied to a twin-screw extruder (L/D=42). The barrel temperature of the extruder was set at 300° C. The resultant resin composition was subjected to injection molding (at a cylinder temperature of 260° C. and a mold temperature of 90° C.) and the resultant molding was tested. The results are shown in Table 1.

Example 2

The general procedure of Example 1 was repeated except that 200 g of maleic anhydride-modified polypropylene was used instead of 200 g of the epoxy-modified polypropylene. The results are shown in Table 1.

Example 3

The general procedure of Example 1 was repeated except that 100 g of the epoxy-modified polypropylene and 100 g of ethylene/propylene copolymer were used instead of 200 g of the epoxy-modified polypropylene. The results are shown in Table 1.

Comparative Example 1

The general procedure of Example 1 was repeated except that 200 g of ethylene/propylene copolymer was used instead of 200 g of the epoxy-modified polypropylene. The results are shown in Table 1.

Comparative Example 2

The general procedure of Example 1 was repeated without use of any 11-aminoundecanoic acid. The results are shown in Table 1.

Comparative Example 3

The general procedure of Example 1 was repeated except that the barrel temperature was set at 260° C. The results are shown in Table 1.

TABLE 1

| | Peel Test | HDT (°C.) | Tensile Strength (kgf/mm$^2$) | Flexural Strength (kgf/mm$^2$) | Flexural Modulus (kgf/mm$^2$) |
|---|---|---|---|---|---|
| Ex. | | | | | |
| 1 | ○ | 117.1 | 5.175 | 7.804 | 208 |
| 2 | ○ | 116.7 | 5.228 | 8.113 | 215 |
| 3 | ○ | 115.1 | 5.170 | 7.866 | 213 |
| Com. Ex. | | | | | |
| 1 | X | 122.2 | 4.566 | 6.739 | 174 |
| 2 | X | 124.5 | 4.794 | 7.212 | 204 |
| 3 | X | 124.3 | 4.738 | 7.176 | 197 |

Example 4

72.4 g of 11-aminoundecanoic acid was added to 3.2 kg of PC (Caribre 200-4 of Sumitomo Dow), which had been dried at 120° C. for 8 hours, and 0.8 kg of maleic anhydride-modified polypropylene, followed by sufficient mixing by means of a Henschel mixer. The resulting mixture was molten and kneaded by means of a twin-screw extruder at 300° C. In the barrel and the resultant pellets were subjected to injection molding (at a cylinder temperature of 260° C. and a mold temperature of 90° C.). Thereafter, the tests for the physical properties were conducted according to the testing methods set out hereinbefore. The results are shown in Table 2.

Example 5

The general procedure of Example 4 was repeated except that epoxy-modified polypropylene was used instead of the maleic anhydride-modified polypropylene. The results are shown in Table 2.

Comparative Example 4

The general procedure of Example 4 was repeated without use of any 11-aminoundecanoic acid thereby obtaining pellets, followed by injection molding and testing of physical properties. The results are shown in Table 2.

Example 6

50.3 g of 11-aminoundecanoic acid was added to 5.0 kg of PC (Caribre 200-4 of Sumitomo Dow) which had been dried at 120° C. for 8 hours, followed by melt kneading by use of a twin-screw extruder under conditions of 300° C. 0.5 kg of the resultant kneaded mixture was dried at 120° C. for 8 hours, followed by sufficient mixing with 3.5 kg of PC (Caribre 200-20 of Sumitomo Dow) 0.5 kg of polypropylene and 0.5 kg of epoxy-modified polypropylene by means of a Henschel mixer and melt kneading by use of a twin-screw extruder 260° C. The resultant composition was subjected to the tests for the physical properties. The results are shown in Table 2.

Comparative Example 5

The general procedure of Example 6 was repeated without use of any 11-aminoundecanoic acid, thereby obtaining a composition, followed by conducting the tests for the physical properties. The results are shown in Table 2.

Comparative Example 6

In the same manner as in Example 6 using stearic acid instead of the 11-aminoundecanoic acid, there was obtained a composition, followed by conducting the tests for the physical properties.

Comparative Example 7

In the same manner as in Example 6 using homopolypropylene instead of the epoxy-modified polypropylene, there was obtained a composition. The results of the tests for the physical properties are shown in Table 2.

Example 7

The general procedure of Example 4 was repeated using 2.5 kg of PC (Caribre 200-4 of Sumitomo Dow) and 2.5 kg of maleic anhydride-modified polypropylene, thereby obtaining a composition. The results of the tests for the physical properties are shown in Table 2.

Comparative Example 8

In the same manner as in Example 7 without use of any 11-aminoundecanoic acid, there was obtained a composition. The results of the tests for the physical properties are shown in Table 2.

Example 8

72.4 g of 11-aminoundecanoic acid was added to 3.6 kg of PC (Caribre 200-4 of Sumitomo Dow), which had been dried at 120° C. for 8 hours, and 0.4 kg of maleic anhydride-modified polyethylene, followed by sufficient mixing by means of a Henschel mixer. The resulting mixture was molten and kneaded by means of a twin-screw extruder under conditions of 300° C. and the resultant pellets were subjected to injection molding (at a cylinder temperature of 260° C. and a mold temperature of 90° C.). Thereafter, the tests for the physical properties were conducted. The results of the measurements are shown in Table 2.

Comparative Example 9

In the same manner as in Example 8 without use of any 11-aminoundecanoic acid, there was obtained a composition. The results of the measurements for the physical properties are shown in Table 2.

Example 9

72.4 g of 11-aminoundecanoic acid was added to 3.1 kg of PC (Caribre 200-4 of Sumitomo Dow), which had been dried at 120° C. for 8 hours, 0.7 kg of maleic anhydride-modified polypropylene and 0.2 kg of styrene/ethylene/propylene copolymer, followed by sufficient mixing by means of a Henschel mixer. The resulting mixture was melt kneaded by means of a twin-screw extruder under conditions of 300° C. and the resultant pellets were subjected to injection molding (at a cylinder temperature of 260° C. and a mold temperature of 90° C.). Thereafter, the tests for the physical properties were conducted. The results of the measurements are shown in Table 2.

Comparative Example 10

In the same manner as in Example 9 without use of any 11-aminoundecanoic acid, there was obtained a composition. The results of the tests for the physical properties are shown in Table 2.

As will be apparent from Tables 1 and 2, the compositions of the invention exhibit both good characteristics and good surface properties. In contrast, the compositions of the comparative examples are found to be inferior in the surface properties.

Figure 2:
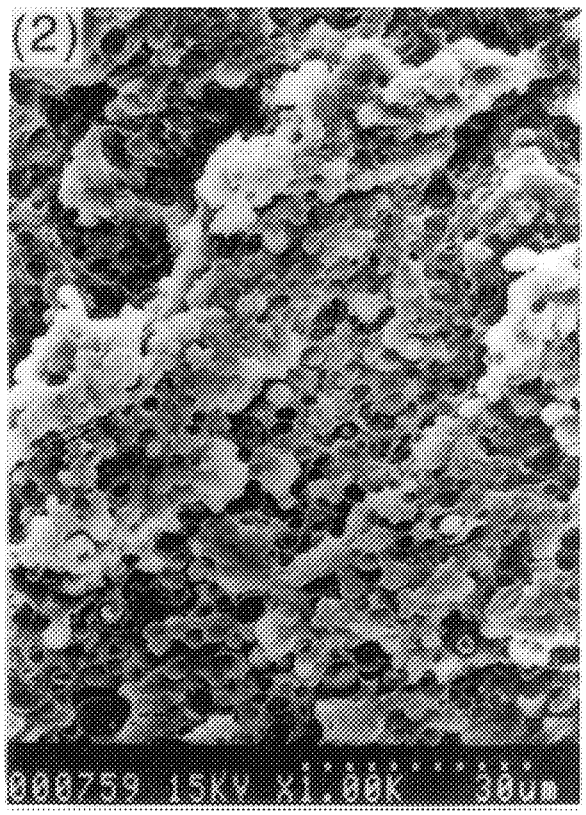
FIG. 2 is an electron microscope photograph of a particle structure showing the dispersion of constituent components of a composition obtained by adding 11-aminoundecanoic acid (1.8 wt % based on a mixture of PC (70 wt %) and maleic anhydride-modified polypropylene (30 wt %) to the mixture.
Figure 3:
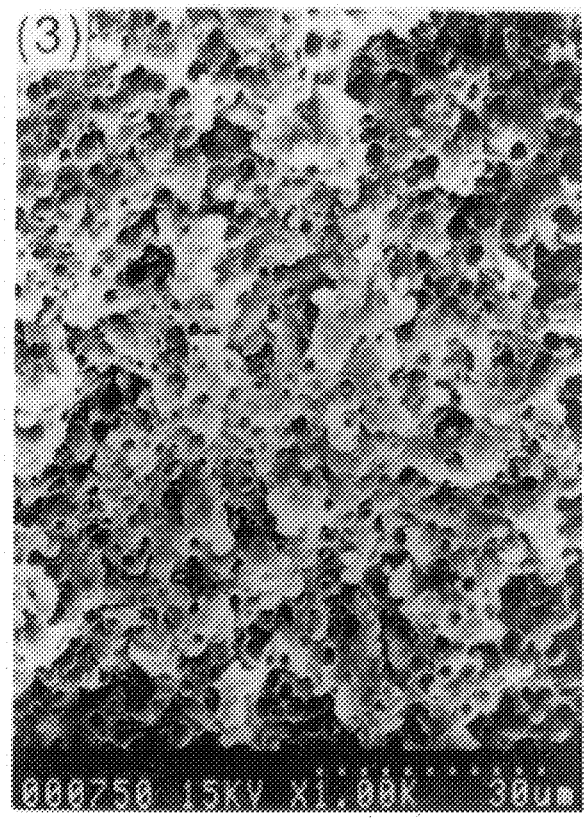
FIG. 3 is an electron microscope photograph of a particle structure showing the dispersion of constituent components of a composition obtained by adding 11-aminoundecanoic acid (1.8 wt % based on a mixture of PC (70 wt %) and epoxy-modified polypropylene (30 wt %) to the mixture.

In order to evidence the excellence of the present invention, the results of the SEM observation of the section of the compositions are shown in FIGS. 1 to 3. FIG. 1 shows the section of a composition for comparison which comprises PC (70 wt %) and polypropylene (30 wt %), and FIG. 2 shows the section of a composition comprising PC (70 wt %), maleic anhydride-modified polypropylene (30 wt %) and 11-aminoundecanoic acid (1.8 wt %) FIG. 3 is for a composition comprising PC (70 wt %), epoxy-modified polypropylene (30 wt %) and 11-aminoundecanoic acid (1.8 wt % based on the mixture of PC and the modified polypropylene). The compositions shown in FIGS. 2 and 3 are inventive ones and are significantly smaller in the size of dispersed particles (dispersed particles=polypropylene-based resin) than that of FIG. 1, revealing that the miscibility of the PC with the polypropylene-based resin is improved.

TABLE 2

| Sample | PC | PP | Modified[1] Polyolefin | 11-amino undeca-noic acid | SEP[2] | Flexural Modulus (kgf/mm[2]) | Tensile Strength (kgf/mm[2]) | Izod Impact Strength (notched) (kgf · cm/cm) | HDT (°C.) | Peel Test |
|---|---|---|---|---|---|---|---|---|---|---|
| Ex. 4 | 80 | — | 20 (MAH-PP) | 1.8 | — | 216 | 5.2 | 23 | 117 | ○ |
| 5 | 80 | — | 20 (Epoxy-PP) | 1.8 | — | 208 | 5.2 | 10 | 117 | ○ |
| 6 | 80[3] | 10 | 10 (Epoxy-PP) | 0.1 | — | 196 | 4.6 | 15 | 126 | ○ |
| 7 | 50 | — | 50 | 1.8 | — | 162 | 4.0 | 25 | 119 | ○ |

TABLE 2-continued

| Sample | PC | PP | Modified[1] Polyolefin | 11-amino undeca- noic acid | SEP[2] | Flexural Modulus (kgf/mm[2]) | Tensile Strength (kgf/mm[2]) | Izod Impact Strength (notched) (kgf · cm/cm) | HDT (°C.) | Peel Test |
|---|---|---|---|---|---|---|---|---|---|---|
| 8 | 90 | — | (MAH-PP) 10 | 1.8 | — | 217 | 5.7 | 43 | 125 | ◯ |
| 9 | 77.5 | — | (MAH-PE) 17.5 (MAH-PP) | 1.8 | 5 | 206 | 4.9 | 42 | 112 | ◯ |
| Com.Ex.4 | 80 | — | 20 (MAH-PP) | — | — | 186 | 4.1 | 33 | 126 | X |
| 5 | 80[3] | 10 | 10 (Epoxy-PP) | — | — | 182 | 4.1 | 35 | 124 | X |
| 6 | 80[3] | 10 | 10 (Epoxy-PP) | 0.1[4] | — | 198 | 4.8 | 5.8 | 115 | X |
| 7 | 80 | 20 | — | 0.1 | — | 207 | 5.1 | 17 | 113 | X |
| 8 | 50 | — | 50 (MAH-PP) | 1.8 | — | 158 | 4.0 | 27 | 117 | X |
| 9 | 90 | — | 10 (MAH-PE) | — | — | 219 | 5.8 | 23 | 121 | X |
| 10 | 77.5 | — | 17.5 (MAH-PP) | — | 5 | 201 | 4.7 | 38 | 110 | X |

[1]MAH-PP: maleic anhydride-modified polypropylene MAH-PE: maleic anhydride-modified polyethylene Epoxy-PP: epoxy-modified polypropylene
[2]Styrene-Ethylene-Propylene copolymer
[3]10 wt % of PC was pre-mixed with 11-aminoundecanoic acid. The resultant mixture and other components were then mixed.
[4]Stearic acid was mixed instead of 11-aminoundecanoic acid.

[2] The invention is further described by way of examples with respect to a method for producing a polycarbonate/polyolefin based resin composition according to the second aspect of the invention. The starting materials and evaluation methods used in these examples are shown below. The other starting materials are described above.

Starting Materials
(B) Polyethylene
Linear low density polyethylene (LLDPE)
Linirex AM0710 (MI=0.3) made by Nippon Petrochemicals Co., Ltd.)
(C) Modified polyolefins
Maleic anhydride-modified linear Low density polyethylene,
Admer NB550, made by Mitsui Petrochemical Industries, Ltd.
Maleic anhydride-modified ethylene-propylene block copolymer, C-800X, made by Tonen Corporation Melt kneading
A twin-screw extruder (TEX30HSST) mnade by The Japan Steel Works, Ltd., was used at an output rate of 10 kg/hour.

Injection molding

An injection molding machine, SAV-60-52, made by Sanjo Seiki Co., Ltd., was used and the injection molding was effected at a molding temperature of 260° C. Measurement of characteristic properties Example 10

4 kg of maleic anhydride-modified polypropylene (AP590P of Mitsubishi Kasei Corp.) and 40.2 g of 11-aminoundecanoic acid were pre-mixed in a Henschel mixer, followed by melt kneading by means of a twin-screw extruder (L/D=42) at a barrel temperature of 260° C. The resultant pellets were dried in vacuum at 80° C. for 16 hours, part of which was purified with hot xylene and acetone and shaped into a film by means of a hot press, followed by subjecting to IR spectral analysis. As a result, it was found that the peak (at 1784 cm-1) derived from the maleic anhydride disappeared but the peak (170cm-1) derived from the carboxyl group of the 11-aminoundecanoic acid freshly appeared. This reveals that the 11-aminoundecanoic acid is chemically bonded to the maleic anhydride-modified polypropylene.

Figure 4:
FIG. 4 is an electron microscope photograph (with 3000 magnifications) of a particle structure showing the dispersion of constituents of a composition obtained by Example 10 (70 wt % PC, 30 wt % modified polypropyrene with 11-aminoundecanoic acid)

1.2 kg of the 11-aminoundecanoic acid-modified maleic anhydride-modified polypropylene and 1.8 kg of polycarbonate (Caribre 200-4 of Sumitomo Dow), which had been dried at 120° C. or 8 hours, were sufficiently premixed (PC 70 wt %, modifies polypropyrene 30 wt %) by means of the Henschel mixer, followed by melt kneading by means of a twin-screw extruder at a barrel temperature of 300° C. The strand obtained by the extrusion molding was made thinner by use of a microtome and dyed with $RuO_4$, followed by observation through a transmission-type electron microscope. The electron microphotograph is shown in FIG. 4. The resultant resin composition was subjected to injection molding (at a cylinder temperature of 260° C. and a mold temperature of 90° C.) to obtain a molding, followed by subjecting to measurements so mechanical strength, heat resistance and the like. The results are shown in Table 3.

Example 11

The general procedure of Example 10 was repeated except that epoxy-modified polypropylene (modified C-900X of Tonen Corp.) was used instead of the maleic anhydride-modified polypropylene) and 1.2 kg of the 11-aminoundecanoic acid-modified epoxi-modified polypropylene was used. The results are shown in Table 3.

Example 12

The general procedure of Example 10 was repeated except that maleic anhydride-modified ethylene-propylene block copolymer (C-800X of Tonen Corp.) was used instead of the maleic anhydride-modified polypropylene. The results are shown in Table 3.

Example 13

The general procedure of Example 10 was repeated except that maleic anhydride-modified linear low density polyethylene (Admer NB550 of Mitsui Petrochemical Industries Co., Ltd.) was used instead of the maleic anhydride-modified polypropylene. The results are shown in Table 3.

Comparative Example 11

Figure 5:
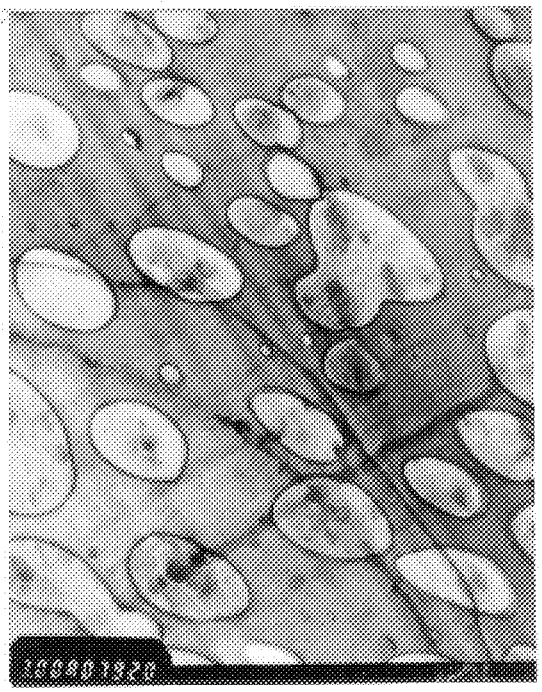
FIG. 5 is an electron microscope photograph (with 3000 magnifications) of a particle structure showing the dispersion of constituents of a composition obtained by Comparative Example 11 (70 wt % PC, 30 wt % polypropyrene without 11-aminoundecanoic acid)

In the same manner as in Example 10 without use of any 11-aminoundecanoic acid, 1.2 kg of maleic anhydride-modified polypropylene was used with 1.8 kg of polycarbonate, there was obtained a resin composition. The state of the dispersed particles in a strand is shown in a photograph of FIG. 5 and the mechanical characteristics and heat resistance of the injection molding sample are shown in Table 3.

Comparative Example 12

In the same manner as in Example 11 without use of any 11-aminoundecanoic acid, there was obtained a resin composition. The mechanical characteristics and heat resistance of the injection molding sample are shown in Table 3.

Comparative Example 13

In the same manner as in Example 12 without use of any 11-aminoundecanoic acid, there was obtained a resin composition. The mechanical characteristics and heat resistance of the injection molding sample are shown in Table 3.

Comparative Example 14

In the same manner as in Example 13 without use of any 11-aminoundecanoic acid, there was obtained a resin composition. The mechanical characteristics and heat resistance of the injection molding sample are shown in Table 3.

Example 14

The general procedure of Example 10 was repeated except that 0.15 kg of 11-aminoundecanoic acid-modified polypropylene and 2.85 kg of polycarbonate were used. The results of the measurements of the physical properties are shown in Table 4.

Example 15

The general procedure of Example 10 was repeated except that 0.30 kg of 11-aminoundecanoic acid-modified polypropylene and 2.70 kg of polycarbonate were used. The results of the measurements of the physical properties are shown in Table 4.

Example 16

The general procedure of Example 10 was repeated except that 0.60 kg of the 11-aminoundecanoic acid-modified polypropylene and 2.40 kg of the polycarbonate were used, respectively. The results of measurements of the physical properties are shown in Table 4.

Example 17

The general procedure of Example 13 was repeated except that 0.09 kg of the 11-aminoundecanoic acid-modified linear low density polyethylene and 2.91 kg of the polycarbonate were uses, respectively. The results of measurements of the physical properties are shown in Table 4.

Example 18

The general procedure of Example 13 was repeated except that 0.15 kg of the 11-aminoundecanoic acid-modified linear low density polyethylene and 2.85 kg of the polycarbonate were used, respectively. The results of measurements of the physical properties are shown in Table 4.

Example 19

The general procedure of Example 13 was repeated except that 0.21 kg of the 11-aminoundecanoic acid-modified linear low density polyethylene and 2.79 kg of the polycarbonate were used, respectively. The results of measurements of the physical properties are shown in Table 4.

Example 20

The general procedure of Example 13 was repeated except that 0.30 kg of the 11-aminoundecanoic acid-modified linear low density polyethylene and 2.70 kg of the polycarbonate were used, respectively. The results of measurements of the physical properties are shown in Table 4.

Example 21

The general procedure of Example 16 was repeated except that 0.30 kg of polypropylene (Noblen W101 of Sumitomo Chemical Co., Ltd.) and 0.3 kg of the 11-aminoundecanoic aced-modified polypropylene were used. The results of measurements of the physical properties are shown in Table 4.

Example 22

The general procedure of Example 13 was repeated except that 0.60 kg of 11-aminoundecanoic acid-modified linear low density polyethylene and 0.6 kg of non-modified linear low density polyethylene (Linirex AM0710 of Nippon Petrochemicals Co., Ltd.) were used. The results of measurements of the physical properties are shown in Table 4.

Example 23

The general procedure of Example 10 was repeated except that polycarbonate having an MI value of 20 (Caribre 200-20 of Sumitomo Dow) was used. The results are shown in Table 4.

Comparative Example 15

The general procedure of Example 16 was repeated without addition of any 11-aminoundecanoic acid, thereby obtaining a composition. The results of measurements of the physical properties are shown in Table 4.

Comparative Example 16

The general procedure of Example 20 was repeated without addition of any 11-aminoundecanoic acid, thereby obtaining a composition. The results of measurements of the physical properties are shown in Table 4.

TABLE 3

|  | Peel Test | HDT (°C.) | Tensile Strength (kgf/mm$^2$) | Flexural Strength (kgf/mm$^2$) | Izod Impact Strength (notched) (kgf · cm/cm) |
|---|---|---|---|---|---|
| Ex. | | | | | |
| 10 | Δ | 123.7 | 5.14 | 7.59 | 14.3 |
| 11 | Δ | 125.7 | 5.10 | 7.39 | 25.8 |
| 12 | Δ | 124.4 | 5.03 | 6.98 | 28.3 |
| 13 | Δ | 116.7 | 4.75 | 5.42 | 58.7 |
| Com. Ex. | | | | | |
| 11 | X | 120.7 | 4.19 | 6.39 | 18.3 |

TABLE 3-continued

| | Peel Test | HDT (°C.) | Tensile Strength (kgf/mm$^2$) | Flexural Strength (kgf/mm$^2$) | Izod Impact Strength (notched) (kgf · cm/cm) |
|---|---|---|---|---|---|
| 12 | X | 119.3 | 4.30 | 6.54 | 30.8 |
| 13 | X | 118.3 | 4.51 | 6.34 | 27.5 |
| 14 | X | 109.3 | 4.50 | 5.01 | 38.7 |

TABLE 4

| | Peel Test | HDT (°C.) | Tensile Strength (kgf/mm$^2$) | Flexural Strength (kgf/mm$^2$) | Izod Impact Strength (notched) (kgf · cm/cm) |
|---|---|---|---|---|---|
| Ex. | | | | | |
| 14 | ○ | 138.0 | 5.91 | 8.49 | 86.6 |
| 15 | ○ | 134.4 | 5.41 | 8.28 | 86.5 |
| 16 | ○ | 128.5 | 5.30 | 7.96 | 81.4 |
| 17 | ○ | 140.6 | 5.97 | 8.46 | 90.6 |
| 18 | ○ | 138.7 | 5.90 | 8.16 | 84.1 |
| 19 | ○ | 134.7 | 5.49 | 7.71 | 46.2 |
| 20 | ○ | 131.7 | 5.34 | 7.29 | 25.1 |
| 21 | Δ | 126.7 | 5.23 | 7.65 | 82.1 |
| 22 | Δ | 118.1 | 4.72 | 5.28 | 59.2 |
| 23 | Δ | 123.7 | 5.08 | 7.43 | 12.8 |
| Com. Ex. | | | | | |
| 15 | X | 126.5 | 4.90 | 7.54 | 47.2 |
| 16 | X | 128.9 | 5.21 | 7.19 | 20.3 |

As will be apparent from Tables 3 and 4, the PC/polyolefin compositions obtained according to the process of the invention has both good miscibility and good mechanical strength and heat resistance. In contrast, the compositions of the comparative examples are inferior in the surface properties.

In order to confirm the excellent effect of the invention, the strands obtained after the extrusion molding were, respectively, made thin by means of a microtome, dyed with RuO$_4$ and observed through a transmission-type electron microscope. The electron microphotographs are shown in FIGS. 4 (Example 10) and 5 (Comparative Example 11), respectively. While the PC/polyolefin composition obtained according to the process of the invention (the photograph of FIG. 4) has fine particles dispersed therein, the composition (the phonograph of FIG. 5) obtained by the simple blending without use of the process of the invention has larger-size dispersed particles. This reveals than the process of the invention contributes to improved miscibility.

[3] The molded articles of the resin compositions having good wear properties according to the third aspect of the invention, which should not be construed as limiting the invention thereto. In these examples, the following abbreviations are used. The other starting materials are described above.

PC: polycarbonate
LDPE: low density polyethylene
LLDPE: linear low density polyethylene
HDPE: high density polyethylene
PTFE: polytetrafluoroethylene Starting materials used
(B) Polyethylene resins
Linirex AM0710 (LLDPE with a melt index of 0.3) of Nippon Petrochemicals Co., Ltd.
Stafron E703 (HDPE with a melt index of 0.3) of Nippon Petrochemicals Co., Ltd.
Rexron M14 (LDPE with a melt index of 0.3) of Nippon Petrochemicals Co., Ltd.
(C) Modified polyethylene resins
Admer NB550 (maleic anhydride-modified LLDPE with a melt index of 0.9 and an amount of modification of 0.14%*) of Mitsui Petrochemicals Co., Ltd.
Admer NF510 (maleic anhydride-modified LLDPE with a melt index of 1.8 and an amount of modification of 0.07%*) of Mitsui Petrochemicals Co., Ltd.
Admer NF505 (maleic anhydride-modified LLDPE with a melt index of 3.5 and an amount of modification of 0.09%*) of Mitsui Petrochemicals Co., Ltd.
Admer NF550 (maleic anhydride-modified LLDPE with a melt index of 6.5 and an amount of modification of 0.26%*) of Mitsui Petrochemicals Co., Ltd.
Admer HB550 (maleic anhydride-modified HDPE with a melt index of 0.2 and an amount of modification of 0.07%*) of Mitsui Petrochemicals Co., Ltd.
Admer LF300 (maleic anhydride-modified LDPE with a melt index of 1.2 and an amount of modification of 0.09%*) of Mitsui Petrochemicals Co., Ltd.
*) The amount of modification was quantitatively determined according to IR spectra.
(D) HOOC—R—NH$_2$
11-aminoundecanoic acid, 6-aminocaproic acid, p-aminobenzoic acid (all made by Aldrich)

Melt kneading

A twin-screw extruder (TEX30HSST) made by The Japan Steel Works, Ltd., was used for kneading at 260° C. or 300° C. at an output rate of 10 kg/hour.

Injection molding

An injection molding machine, SAV-60-52, made by Sanjo Seiki Co., Ltd., was used. The injection molding was effected under conditions of a cylinder temperature of 260° C., an injection pressure of 50 kg/cm$^2$, an injection rate of 50% and a mold temperature of 100° C. for pieces for bending and tensile tests and under conditions of a cylinder temperature of 290° C., an injection pressure of 70 kg/cm$^2$, an injection rate of 50% and a mold temperature of 100° C. for a ring-shaped piece for wear test. Measurement of physical properties
(1) Wear test: a ring-shaped molding was molded and was subjected to a wear test using a counterpart having a similar shape (made of a steel (S-45C) ). The conditions of a ring-on-ring method included a linear velocity of 30 m/minute, a load of 2.6 kg/cm$^2$ and a test time of 72 hours. The torque at the time of the wear test was detected with a load cell, from which a coefficient of dynamic friction was calculated. A specific abrasion loss was determined from a variation in weight prior to and after the wear test. Some samples were subjected to measurement of a linear abrasion loss thereof as a function of time under conditions where a laser displacement detector was attached to a wear tester.
(2) Observation of morphology
A thin film with a thickness of approximately 900 angstroms was taken from a ring-shaped test piece at a section near the sliding surface by use of a microtome, followed by dyeing with RuO$_4$ and observation through a transmission electron microscope. An average aspect ratio was calculated by measuring aspect ratios of arbitrarily selected 100 particles from the resultant electron microphotograph and calculating an average of the 100 measurements. The other measurements of the characteristic properties were used the same methods as already described.

Example 24

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.3 kg of the mixture and 9.7 kg of polycarbonate (MI=4) were mixed in the Henschel ratio followed by melt kneading at 300° C. by use of the twin-screw extruder. The resultant mixture was dried at 120° C. for 8 hours and injection molded, followed by measurements of physical properties. The results are shown in Table 5. The transmission-type electron microscope photograph of a section in the vicinity of the sliding surface of a ring-shaped test piece is shown as Photograph A of FIG. 6.

Comparative Example 17

The general procedure of Example 24 was repeated except that linear low density polyethylene (Linirex AM0710) was used instead of the maleic anhydride-modified linear low density polyethylene (Admer NB550) and that 11-aminoundecanoic acid was not added. The results are shown in Table 5 with a transmission-type electron microscope photograph shown as Photograph B of FIG. 6.

Example 25

5 kg of maleic anhydride-modified linear low density polyethylene (Admer N3530) and 50.5 g of 11-aninoundecanoic acid were sufficiently mixed in a Henschel mixer, follower by melt kneading at 260° C. by use of a twin-screw extruder The resultant mixture was dried in vacuum at 80° C. for 12 hours, after which 0.5 kg of the mixture and 9.5 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Table 5.

Example 26

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 1.0 kg of the mixture and 9.0 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Table 5.

Example 27

5 kg of maleic anhydride-modified linear low density polyethylene (Admer NF510) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Table 5.

Example 28

5 kg of maleic anhydride-modified linear low density polyethylene (Admer NF505) and 50.5 g of 11-aminoundecanoic acid were sufficiently mixed in a Henschel mixer, followed by melt kneading at 260° C. by use of a twin-screw extruder. The resultant mixture was dried in vacuum a. 80° C. for 12 hours, after which 0.5 kg of the mixture and 9.5 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Table 5.

Example 29

5 kg of maleic anhydride-modified linear low density polyethylene (Admer NF550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg or polycarbonate (MI=4) were mixed in the Henschel mixer, followed by melt kneading at 300° C. by, use of the twin-screw extruder. The resultant mixture was dried at 120° C. for 8 hours and injection molded, followed by measurements of physical properties. The results are shown in Table 5.

Example 30

5 kg of maleic anhydride-modified linear low density polyethylene (Admer NB550) and 50.5 c of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=20) were mixed in the Henschel mixer, followed by melt kneading at 300° C. by use of the twin-screw extruder. The resultant mixture was Dried at 120° C. for 8 hours and injection molded, followed by measurements of physical properties. The results are shown in Table 5.

Comparative Example 18

The general procedure of Example 26 was repeated except that linear low density polyethylene (Linirex AM0710) was used instead of the maleic anhydride-modified linear low density polyethylene (Admer NB550) and that 11-aminoundecanoic acid was not added. The results are shown in Table 5.

Example 31

5 kg of maleic anhydride-modified linear low density polyethylene (Admer HB500) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9 5 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Table 5.

Comparative Example 19

The general procedure of Example 31 was repeated except that high density polyethylene (Stafron E703) was used instead of the maleic anhydride-modified linear low density polyethylene (Admer HB500) and that 11-aminoundecanoic acid was not added. The results are shown in Table 5.

Example 32

5 kg of maleic anhydride-modified low density polyethylene (Admer LF300) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Table 5.

Comparative Example 20

The general procedure of Example 32 was repeated except that low density polyethylene (Rexron 4) was used instead of the maleic anhydride-modified low density polyethylene (Admer LF300) and that 11-aminoundecanoic acid was not added. The results are shown in Table 5.

Example 33

The general procedure of Example 25 was repeated using 6-aminocaproic acid In place of 11-aminoundecanoic acid. The results are shown in Table 5.

Example 34

The general procedure of Example 25 was repeated using p-aminobenzoic acid instead of 11-aminoundecanoic acid. The results are shown in Table 5.

Example 35

0.5 kg of maleic anhydride-modified linear low density polyethylene (Admer NB550), 5.05 g of 11-aminoundecanoic acid and 9.5 kg of polycarbonate (MI= 4) were sufficiently mixed in a Henschel mixer, followed by melt kneading at 300° C. by use of a twin-screw extruder. The resultant mixture was dried at 80° C. for 12 hours in vacuum, followed by injection molding and measurements of physical properties. The results are shown in Table 5.

As will be apparent from Table 5, the compositions of the invention have all good mechanical strength, heat resistance and sliding characteristics. In contrast, the compositions of the comparative examples have been found to be poor in wear properties. It has been also found that the compositions of the examples are substantially equal to a known sliding PC/PTFE material whose characteristic properties are indicated in the table as a reference.

Figure 7:
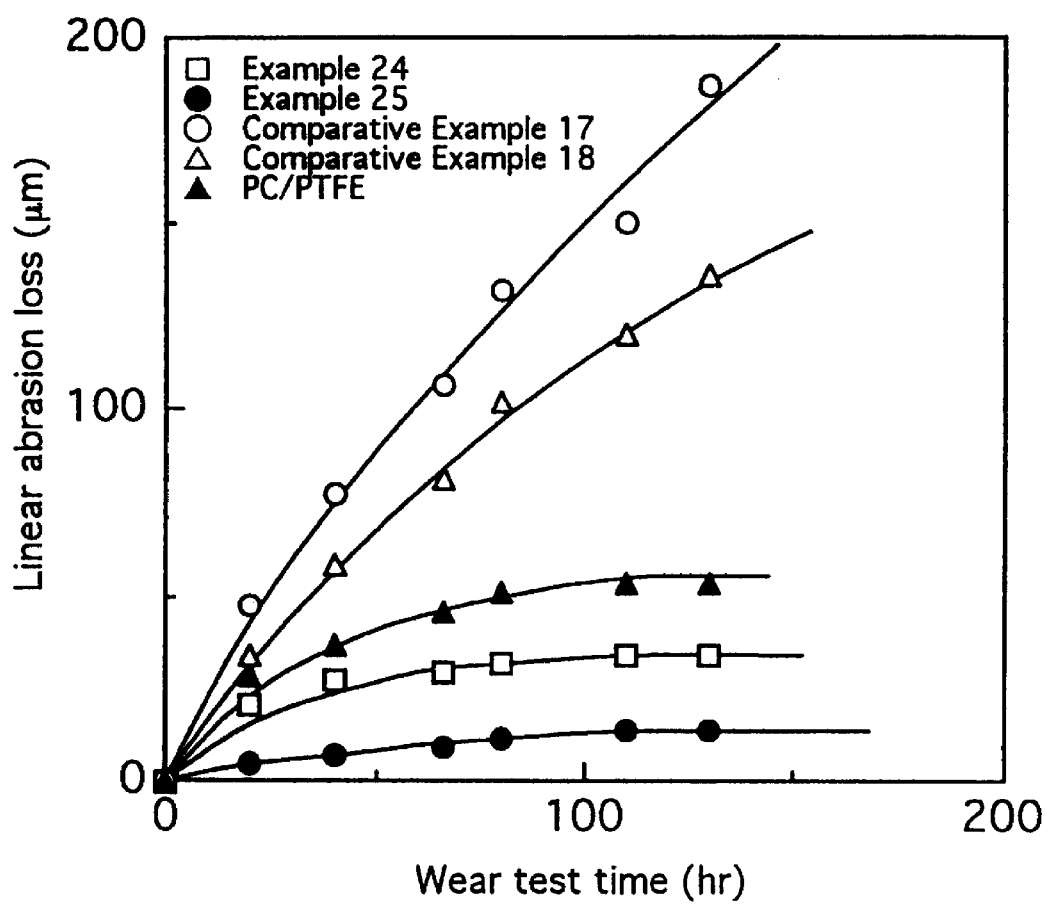
FIG. 7 is a graph showing a variation in linear wear loss of each of the compositions of the examples and the comparative examples and the known PC/PTFE wear resistant material as a functin of time.

FIG. 7 shows a variation in linear wear loss of each or the compositions of the examples and the comparative examples and the known PC/PTFE sliding material as a function of time. From this, it will be seen that the compositions of the examples are better in the wear characteristic.

Figure 6A:
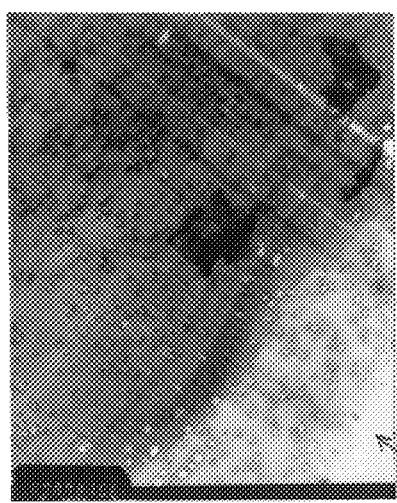
FIG. 6A and 6B are electron microscope photographs A and B of transmission type showing morphology in the vicinities of the surfaces of the ring woldings of Example 24 and comparative Example 17.
Figure 6B:
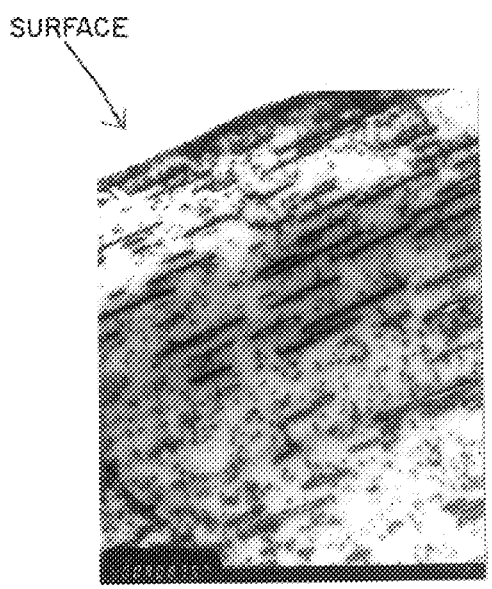

Photographs A and B of FIG. 6 are, respectively, electron microscope photographs showing morphology in the vicinities of the surfaces of the ring moldings of Example 24 and Comparative Example 17. From the transmission type photographs, it will be seen that the dispersion states are apparently different from each other: with the composition of the comparative example, the polyethylene particles elongated in the form of a layer are observed, whereas with the composition of the example, the polyethylene dispersed particles are observed substantially in the form of spheres being dispersed.

TABLE 5

|  | Specific Wear Loss ($\times 10^{-15}$ m$^3$/Nm) | Coefficient of Dynamic Friction | HDT (°C., 18.6 kgf/cm$^2$) | Tensile Strength/ Tensile Modulus (kgf/mm$^2$) | Flexural Strength/ Flexural Modulus (kgf/mm$^2$) | Izod Impact Strength (notched) (kgf · cm/cm) | Average Aspect Ratio of PE particles[1] |
|---|---|---|---|---|---|---|---|
| Ex. 24 | 3.8 | 0.09 | 140.6 | 5.97/198 | 8.46/215 | 90.6 | 1.8 |
| 25 | 1.4 | 0.12 | 138.7 | 5.90/195 | 8.16/208 | 84.1 | 2.3 |
| 26 | 0.9 | 0.15 | 136.2 | 5.87/189 | 7.91/201 | 79.2 | 4.5 |
| 27 | 2.8 | 0.12 | 138.5 | 5.87/194 | 8.06/205 | 85.6 | 2.7 |
| 28 | 2.5 | 0.12 | 138.7 | 5.91/196 | 8.15/209 | 84.3 | 2.5 |
| 29 | 1.5 | 0.13 | 137.9 | 5.89/196 | 8.07/207 | 84.2 | 2.6 |
| 30 | 1.5 | 0.12 | 139.0 | 5.91/194 | 8.21/207 | 83.2 | 2.9 |
| 31 | 5.4 | 0.15 | 138.6 | 5.87/193 | 8.03/206 | 80.3 | 3.1 |
| 32 | 2.7 | 0.16 | 137.9 | 5.68/192 | 8.07/209 | 78.3 | 2.8 |
| 33 | 1.1 | 0.13 | 138.9 | 5.92/196 | 8.21/209 | 84.3 | 3.4 |
| 34 | 1.8 | 0.13 | 138.9 | 5.93/196 | 8.02/209 | 83.6 | 3.9 |
| 35 | 1.7 | 0.13 | 139.0 | 5.94/197 | 8.21/210 | 55.0 | 1.9 |
| Com.Ex. 17 | 56.7 | 0.09 | 136.0 | 5.77/196 | 8.39/207 | 62.5 | 10.3 |
| 18 | 20.3 | 0.16 | 137.2 | 5.89/184 | 7.94/203 | 58.2 | 10.5 |
| 19 | 109.3 | 0.19 | 135.2 | 5.72/189 | 8.01/203 | 63.5 | 9.8 |
| 20 | 25.4 | 0.17 | 136.3 | 5.84/196 | 8.05/204 | 63.7 | 8.9 |
| PC/PTFE[2] | 4.2 | 0.15 | 139.3 | 4.79/172 | 7.04/181 | 26.0 | — |

[1]Average aspect ratio of PE particles dispersed to a depth of 20 μm from the outer surface of strands.
[2]Lubriconp DL4030 ® manufactured by LNP Inc. Composition: PC/PTFE = 85%/15%

[4] The resin compositions and molded articles thereof having a good solvent resistance according to the fourth aspect of the invention is further described by way of examples, which should not be construed as limiting the invention thereto. In the examples, the same abbreviations described above are sometimes used.

Starting materials used
(C) Modified polyolefin resins

Novatec AP590P (maleic anhydride-modified PP with a melt index of 50 and an amount of modification of 0.50%*) of Mitsubishi Kasei Corp.

*) The amount of modification was quantitatively determined from IR spectra.

The other starting materials are described above.

Melt kneading

A twin-screw extruder (TEX30HSST) made by The Japan Steel Works, Ltd., was used for kneading at 260° C. and 300° C. at an output rate of 10 kg/hour.

Injection molding

An injection molding machine, SAV-60-52, made by Sanjo Seiki Co., Ltd., was used. The injection molding was effected under conditions of a cylinder temperature of 260° C., an injection pressure of 50 kg/cm$^2$, an injection rate of 50% and a mold temperature of 100° C.

Measurement of physical properties
(1) Organic solvent resistance test: a test piece for bending test was immersed in gasoline, and an increase in weight of the test piece was measured, along with an appearance change through visual observation, as a function of time.

The other measurements of the characteristic properties were used the same methods as already described.

Example 36

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Tables 6 and 7 and in FIG. 8.

Comparative Example 21

The general procedure of Example 36 was repeated except that linear low density polyethylene (Linirex AM0710) was used instead of the maleic anhydride-modified linear low density polyethylene (Admer NB550) and that 11-aminoundecanoic acid was not added. The results are shown in Tables 6 and 7 and in FIG. 8.

Example 37

Figure 9:
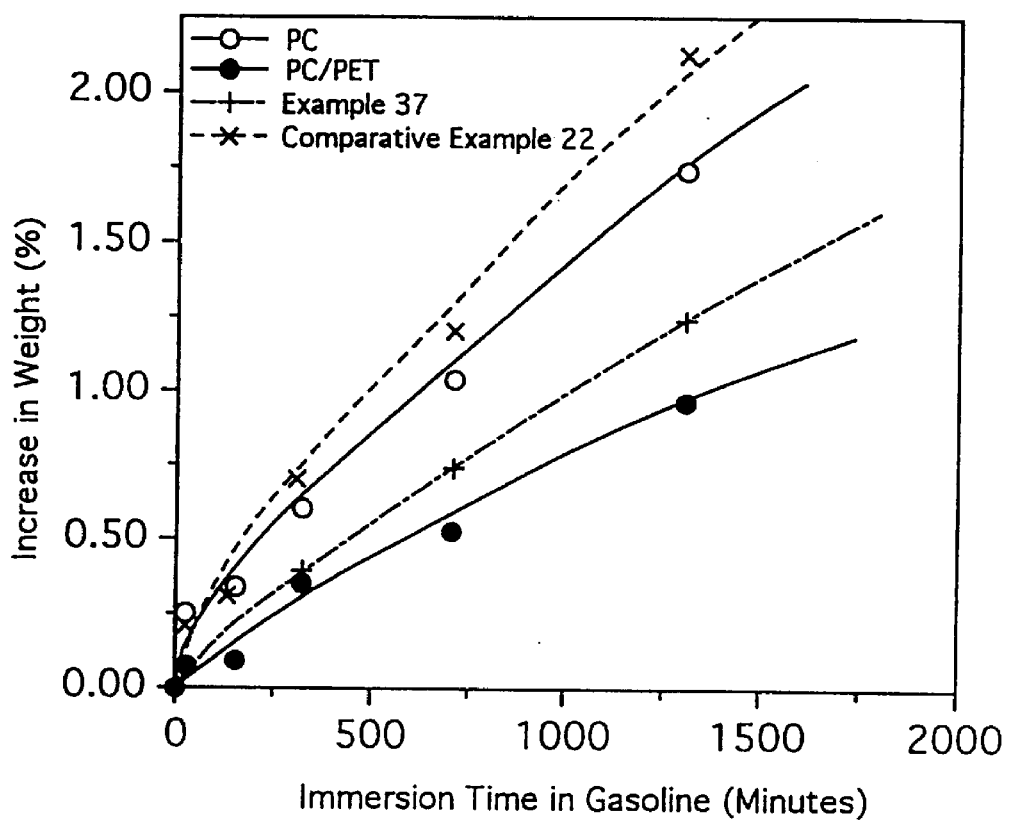
FIG. 9 is a graph showing an increase (%) in weight of the test piece (Example 37, Comparative Example 22) immersed in gasoline as a function of time (minutes)
Figure 10A:
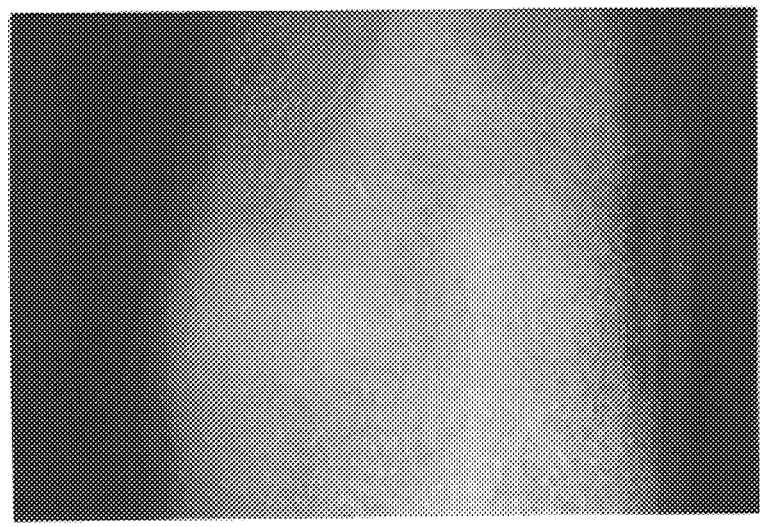
FIG. 10A to 10F are photographs showing test piece surfaces (with 6.5 magnifications) observed after immersion in gasoline for 1320 minutes of the test pieces of the compositions of the examples 36(10D) and 37(10F), the comparative examples 21(10C) and 22(107E), PC(10A) and PC/PET(10B).
Figure 10B:
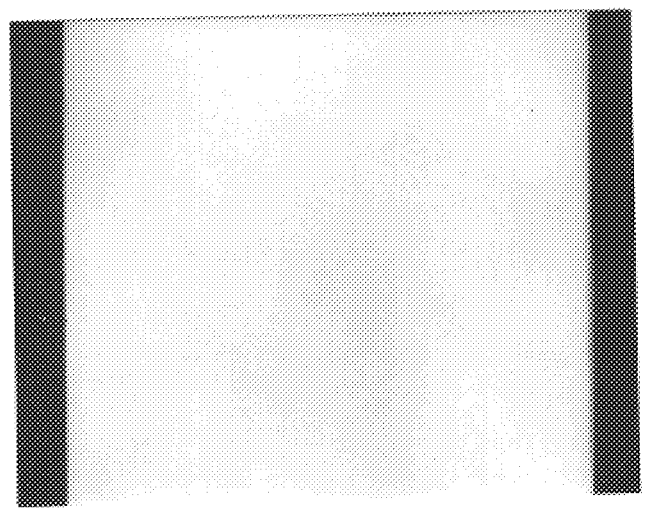
Figure 10C:
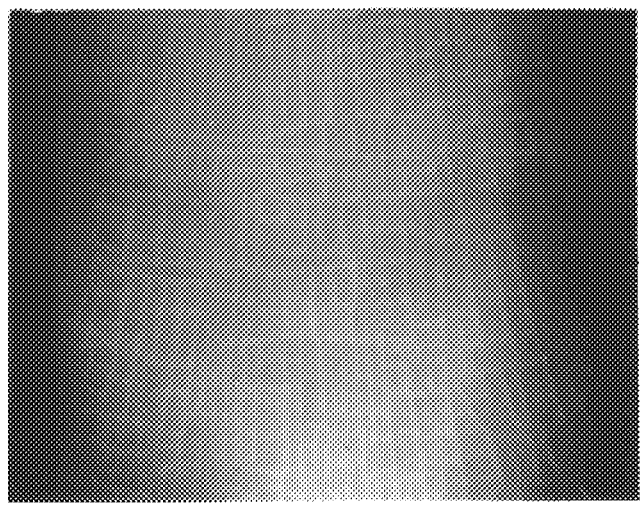
Figure 10D:
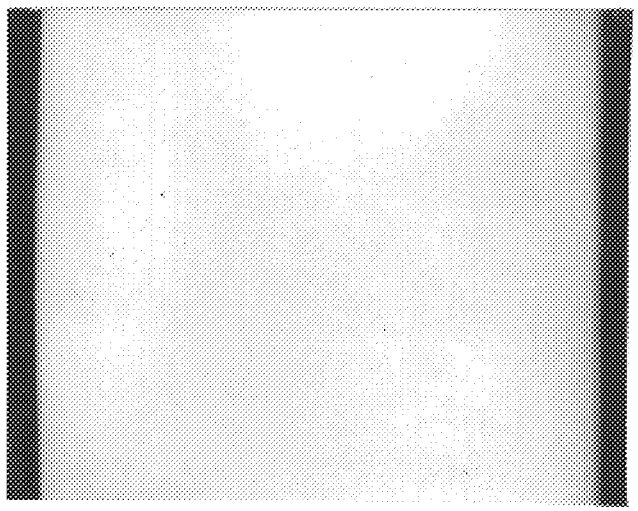
Figure 10E:
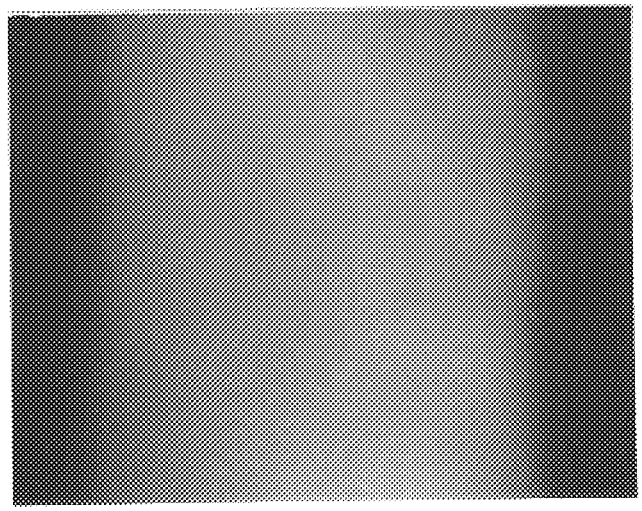
Figure 10F:
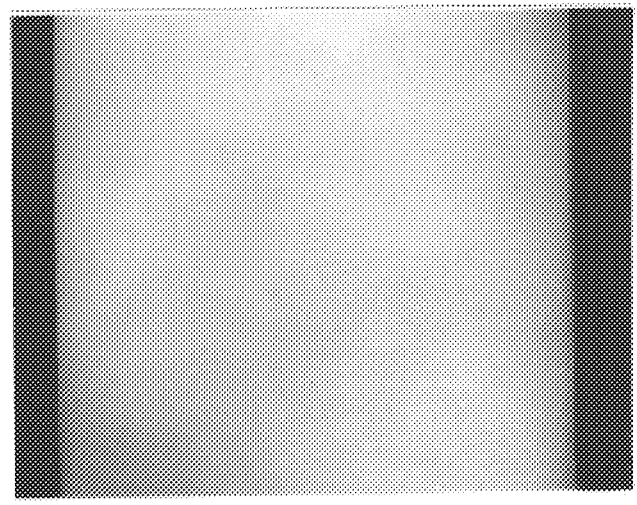

5 kg of maleic anhydride-modified homopolypropylene (AP590P) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4) were mixed in the Henschel mixer, followed by melt kneading at 300° C. by use of the twin-screw extruder. The resultant mixture was dried at 120° C. for 8 hours and injection molded, followed by measurements of physical properties. The results are shown in Tables 6 and 7 and in FIG. 9.

Comparative Example 22

The general procedure of Example 37 was repeated except that homopolypropylene (Noblen W101) was used instead of the maleic anhydride-modified homopolypropylene (AP590P) and that 11-aminoundecanoic acid was not added. The results are shown in Tables 6 and 7 and in FIG. 9.

As will be apparent from Tables 6 and 7, the compositions of the invention have all good mechanical strength and heat resistance also good organic solvent resistance. In contrast, the compositions of the comparative examples and polycarbonate are poor particularly in the organic solvent resistance. The compositions of the examples have organic solvent resistance and mechanical strength equal to or greater than a known PC/PET composition which is shown as a reference.

Figure 8:
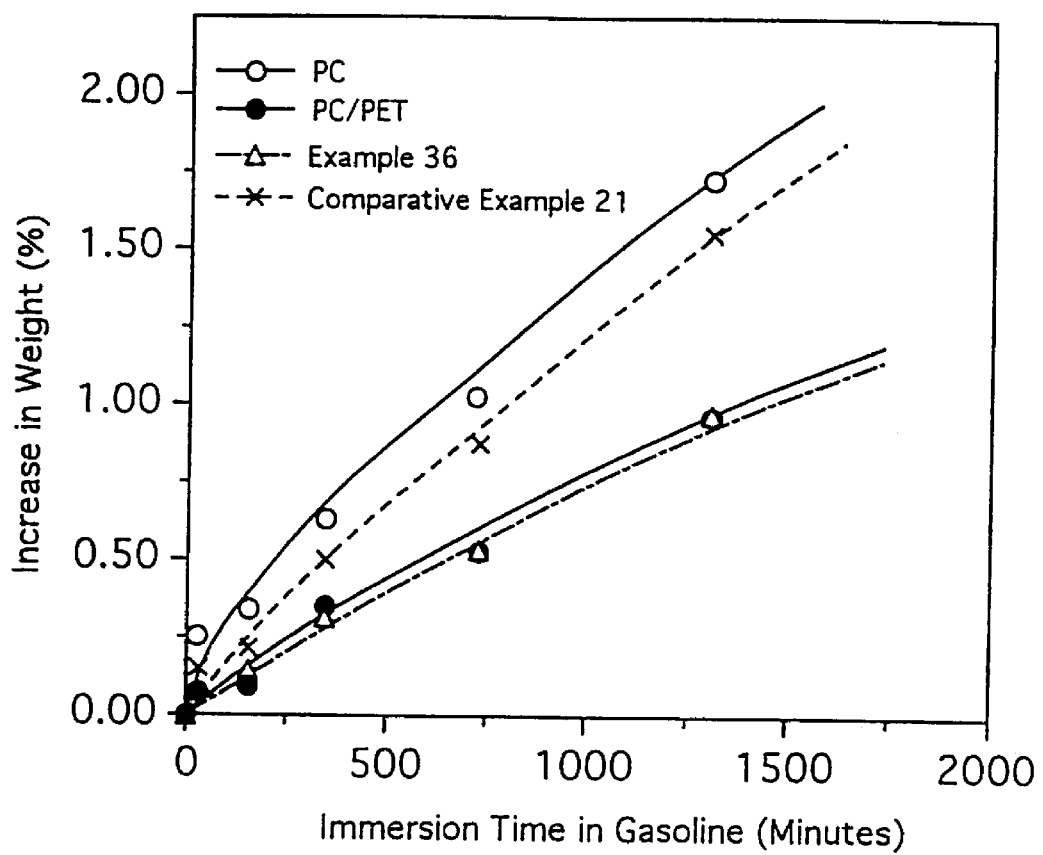
FIG. 8 is a graph showing an increase (%) in weight of the test piece (Example 36, Comparative Example 21) immersed in gasoline as a function of time (minutes)

FIG. 8 shows an increase in weight of the composition of Example 36 in gasoline, the composition of Comparative example 21 and known PC/PET compositions for comparison. The composition of the example is smaller in the increase than the PC and the composition of the comparative example and thus is better in the organic solvent resistance.

Photographs FIG. 10A to FIG. 10F are those photographs of test piece surfaces (×6.5) observed after immersion in gasoline for 1320 minutes of the test pieces of the compositions of the examples (36, 37), comparative examples (21, 22), PC and PC/PET. Although the compositions of the comparative examples and polycarbonate had fine cracks observed in the surfaces, no crack was observed for the compositions of the examples. Thus, little variation in appearance of the examples in the organic solvent was found.

TABLE 6

| | HDT (°C., 18.6 kgf/ cm$^2$) | Tensile Strength (kgf/mm$^2$) | Tensile Modulus (kgf/mm$^2$) | Flexural Strength (kgf/mm$^2$) | Flexural Modulus (kgf/mm$^2$) | Izod Impact Strength (notched) (kgf · cm/cm) |
|---|---|---|---|---|---|---|
| Ex. | | | | | | |
| 36 | 138.7 | 5.90 | 195 | 8.16 | 208 | 84.1 |
| 37 | 137.1 | 5.86 | 194 | 8.21 | 208 | 82.5 |
| Com. Ex. | | | | | | |
| 21 | 136.0 | 5.77 | 196 | 8.39 | 207 | 62.5 |
| 22 | 135.1 | 5.69 | 197 | 8.42 | 207 | 61.3 |
| PC | 134.0 | 6.30 | — | 9.80 | 242 | 75.0 |
| PC/PET | 125.0 | 6.40 | 205 | 9.30 | 228 | 15.0 |

TABLE 7

| Immersion Time (min.) | Appearance | Sample | | | | | |
|---|---|---|---|---|---|---|---|
| | | PC | PC/PET | Ex. 36 | Com. Ex. 21 | Ex. 37 | Com. Ex. 22 |
| 0 | Crack[1] | ○ | ○ | ○ | ○ | ○ | ○ |
| | Turbidity[2] | ○ | — | — | — | — | — |
| | Gloss[3] | ○ | ○ | ○ | ○ | ○ | ○ |

TABLE 7-continued

| Immersion Time (min.) | Appearance | Sample PC | PC/PET | Ex. 36 | Com. Ex. 21 | Ex. 37 | Com. Ex. 22 |
|---|---|---|---|---|---|---|---|
| 30 | Crack | Δ | ○ | ○ | ○ | ○ | ○ |
|  | Turbidity | X | — | — | — | — | — |
|  | Gloss | X | ○ | ○ | Δ | ○ | ○ |
| 150 | Crack | Δ | ○ | ○ | ○ | ○ | Δ |
|  | Turbidity | X | — | — | — | — | — |
|  | Gloss | X | ○ | ○ | Δ | ○ | Δ |
| 330 | Crack | Δ | ○ | ○ | X | ○ | X |
|  | Turbidity | X | — | — | — | — | — |
|  | Gloss | X | Δ | Δ | X | Δ | — |
| 720 | Crack | Δ | ○ | ○ | X | ○ | X |
|  | Turbidity | X | — | — | — | — | — |
|  | Gloss | X | Δ | Δ | X | Δ | X |
| 1320 | Crack | X | ○ | ○ | X | ○ | X |
|  | Turbidity | X | — | — | — | — | — |
|  | Gloss | X | Δ | Δ | X | Δ | — |

[1]Presence or cracks: ○; none, Δ; slight, X; considerable
[2]Turbidity: ○; none, Δ; slight, X; considerable
[3]Gloss: ○; not changed, Δ; slightly changed, X; changed

[5] The glass fiber reinforced resin compositions according to the fifth aspect of the invention is further described in more detail, which should not be construed as limiting the invention thereto. The melt kneading and injection molding were conducted in the following manner and various physical properties were measured according to the following methods.

Starting materials used are described above.

Melt kneading

A twin-screw extruder (TEX30HSST, made by The Japan Steel Works, Ltd.) was used for kneading at 260° C. or 300° C. at an output rate of 10 kg/hour.

Injection molding

An injection molding machine (SAV-60-52 made by Sanjo Seiki Co., Ltd.) was used. The injection molding was effected under conditions of a cylinder temperature of 260° C., an injection pressure of 50 kg/cm$^2$, an injection rate of 50% and a mold temperature of 100° C. for bending and tensile test pieces and under conditions of a cylinder temperature of 290° C., an injection pressure of 70 kg/cm$^2$, an injection rate of 50% and a mold temperature of 100° C. for a ring-shaped piece for wear test.

Measurement of physical properties are described above.

Example 38

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.3 kg of the mixture and 9.7 kg of polycarbonate (MI=4 g/10 minutes) were mixed in the Henschel mixer, followed by melt kneading at 300° C. by use of the twin-screw extruder. The resultant mixture was dried at 120° C. for 8 hours to obtain a polycarbonate resin composition. 3.5 kg of the polycarbonate resin composition and 1.5 kg of glass fibers (having a fiber length of 3 mm and a diameter of the fiber of 9 μm and treated with an aminosilane) were sufficiently mixed by means of the Henschel mixer, followed by kneading at 260° C. by means of the twin-screw extruder to obtain a glass fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Comparative Example 23

The general procedure of Example 38 was repeated except that linear low density polyethylene (Linirex AM0710) was used instead of maleic anhydride-modified linear low density polyethylene (Admer NB550) and that 11-aminoundecanoic acid was not added, thereby obtaining a glass fiber-containing composition. The thus obtained composition was subjected to injection molding to obtain test pieces, followed by measurements of bending strength, modulus of elasticity, impact strength and thermal deformation temperature and also by a wear test. The results are shown in Table 8.

Example 39

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4 g/10 minutes) were mixed in the Henschel mixer, followed by melt kneading at 300° C. by use of the twin-screw extruder. The resultant mixture was dried at 120° C. for 8 hours to obtain a polycarbonate resin composition. 3.5 kg of the polycarbonate resin composition and 1.5 kg of glass fibers (having a fiber length of 3 mm and a diameter of the fiber of 9 μm and treated with an aminosilane) were sufficiently mixed by means of the Henschel mixer, followed by kneading at 260° C. by means of the twin-screw extruder to obtain a glass fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Example 40

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 1.0 kg of the mixture and 9.0 kg of polycarbonate (MI=4 g/10 minutes) where mixed in the Henschel mixer, followed by melt kneading at 300° C. by use of the twin-screw extruder to obtain a polycarbonate resin composition. The polycarbonate resin composition was dried at 120° C. for 8 hours. 3.5 kg of the polycarbonate resin composition and 1.5 kg of glass fibers (having a fiber length of 3 mm and a diameter of the fiber of 9 μm and treated with an aminosilane) were sufficiently mixed by means of the Henschel mixer, followed by kneading at 260° C. by means of a twin-screw extruder to obtain a glass fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Example 41

5 kg of maleic anhydride-modified linear low density polyethylene (Admer NF510) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4 g/10 minutes) were mixed in the Henschel mixer, followed by melt kneading at 300° C. by use of the twin-screw extruder to obtain a polycarbonate resin composition. The polycarbonate resin composition was dried at 120° C. for 8 hours. 3.5 kg of the polycarbonate resin composition and 1.5 kg of class fibers (having a fiber length of 3 mm and a diameter of the fiber of 9 μm and treated with an aminosilane) were sufficiently mixed by means of the Henschel mixer, followed by kneading at 260° C. by means of the twin-screw extruder to obtain a class fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Example 42

5 kg of maleic anhydride-modified linear low density polyethylene (Admer NF505) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4 g/10 minutes) were mixed in the Henschel mixer, followed by melt kneading at 300° C. by use of the twin-screw extruder to obtain a polycarbonate resin composition. The polycarbonate resin composition was dried at 120° C. for 8 hours. 3.5 kg of the polycarbonate resin composition and 1.5 kg of glass fibers (having a fiber length of 3 mm and a diameter of the fiber of 9 μm and treated with an aminosilane) were sufficiently mixed by means of the Henschel mixer, followed by kneading at 260° C. by means of the twin-screw extruder to obtain a glass fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Example 43

5 kg of maleic anhydride-modified linear low density polyethylene (Admer NF550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4 g/10 minutes) were mixed in the Henschel mixer, followed by melt kneading at 300° C. by use of the twin-screw extruder to obtain a polycarbonate resin composition. The polycarbonate resin composition was dried at 120° C. for 8 hours. 3.5 kg of the polycarbonate resin composition and 1.5 kg of glass fibers (having a fiber length of 3 mm and a diameter of the fiber of 9 μm and treated with an aminosilane) were sufficiently mixed by means of the Henschel mixer, followed by kneading at 260° C. by means of She twin-screw extruder to obtain a glass fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide rest pieces. The test pieces were subjected to measurements of bending strength, modulus of elasticity, impact strength and thermal deformation temperature.and also to a wear test. The results are shown in Table 8.

Example 44

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=20 g/10 minutes) were mixed in the Henschel mixer, followed by melt kneading at 300° C. by use of the twin-screw extruder to obtain a polycarbonate resin composition. The polycarbonate resin composition was dried at 120° C. for 8 hours. 3.5 kg of the polycarbonate resin composition and 1.5 kg of glass fibers (having a fiber length of 3 mm. and a diameter of the fiber of 9 μm and treated with an aminosilane) were sufficiently mixed by means of the Henschel mixer, followed by kneading at 260° C. by means of the twin-screw extruder to obtain a glass fiber-reinforced polycarbonate resin composition comprised of 70 parts by weigh of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Comparative Example 24

The general procedure of Example 40 was repeated except that linear low density polyethylene (Linirex A0710) was used instead of the maleic anhydride-modified linear low density polyethylene (Admer NB550) and that 11-aminoundecanoic acid was not added, thereby obtaining a glass fiber-containing composition. The thus obtained composition was subjected to injection molding to obtain test pieces, followed by measurements of bending strength, modulus of elasticity, impact strength and thermal deformation temperature and also by a wear test. The results are shown in Table 8.

Example 45

5 kg of maleic anhydride-modified high density polyethylene (Admer HB500) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4) were mixed in the Henschel mixer, followed by melt kneading at 300° C. by use of the twin-screw extruder to obtain a polycarbonate resin composition. The polycarbonate resin composition was dried at 120° C. for 8 hours. 3.5 kg of the polycarbonate resin composition and 1.5 kg of glass fibers (having a fiber length of 3 mm and a diameter of the fiber of 9 μm and treated with an aminosilane) were sufficiently mixed by means of the Henschel mixer, followed by kneading at 260° C. by means of the twin-screw extruder to obtain a glass fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Comparative Example 25

The general procedure of Example 45 was repeated except that high density polyethylene (Stafron E703) was used instead of the maleic anhydride-modified high density polyethylene (Admer NB500) and that 11-aminoundecanoic acid was not added, thereby obtaining a glass fiber-containing composition. The thus obtained composition was subjected to injection molding to obtain test pieces, followed by measurements of bending strength, modulus of elasticity, impact strength and thermal deformation temperature and also by a wear test. The results are shown in Table 8.

Example 46

5 kg of maleic anhydride-modified low density polyethylene (Admer LF300) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4) were mixed in the Henschel mixer, followed by melt kneading at 300° C. by use of the twin-screw extruder to obtain a polycarbonate resin composition. The polycarbonate resin composition was dried at 120° C. for 8 hours. 3.5 kg of the polycarbonate resin composition and 1.5 kg of glass fibers (having a fiber length of 3 mm and a diameter of the fiber of 9 μm and treated with an aminosilane) were sufficiently mixed by means of the Henschel mixer, followed by kneading at 260° C. by means of the twin-screw extruder to obtain a glass fiber-reinforced polycarbonate resin composition comprised of 70 parts by weight of the polycarbonate resin composition and 30 parts by weight of the glass fibers. The glass fiber-reinforced polycarbonate resin composition was subjected to injection molding to provide test pieces. The test pieces were subjected to measurements of bending strength, modulus of elasticity, impact strength and thermal deformation temperature and also to a wear test. The results are shown in Table 8.

Comparative Example 26

The general procedure of Example 46 was repeated except that low density polyethylene (Rexron M14) was used instead of the maleic anhydride-modified low density polyethylene (Admer LF300) and that 11-aminoundecanoic acid was not added, thereby obtaining a glass fiber-containing composition. The thus obtained composition was subjected to injection molding to obtain test pieces, followed by measurements of bending strength, modulus of elasticity, impact strength and thermal deformation temperature and also by a wear test. The results are shown in Table 8.

Example 47

The general procedure of Example 40 was repeated using 6-aminocaproic acid instead of the 11-aminoundecanoic acid thereby producing a glass fiber-reinforced polycarbonate resin composition. The resin composition was subjected to injection molding to provide test pieces, followed by measurements of bending strength, modulus of elasticity, impact strength and thermal deformation temperature and also by a wear test. The results are shown in Table 8.

Example 48

The general procedure of Example 40 was repeated using p-aminobenzoic acid instead of the 11-aminoundecanoic acid thereby producing a glass fiber-reinforced polycarbonate resin composition. The resin composition was subjected to injection molding to provide test pieces, followed by measurements of bending strength, modulus of elasticity, impact strength and thermal deformation temperature and also by a wear test. The results are shown in Table 8.

Example 49

0.5 kg of maleic anhydride-modified low density polyethylene (Admer NB550), 0.05 kg of 11-aminoundecanoic acid, 4.5 kg of polycarbonate (MI=4 g/10 minutes) and 2.14 kg of glass fibers (having a fiber length of 3 mm and a diameter of the fiber of 9 μm and treated with an aminosilane) were sufficiently mixed in a Henschel mixer, followed by melt kneading at 300° C. by use of a twin-screw extruder, thereby obtaining a glass fiber-reinforced polycarbonate resin composition comprised of 70 parts by weight of the polycarbonate resin composition and 30 parts by weight of the glass fibers. The glass fiber-reinforced polycarbonate resin composition was dried at 120° C. for 8 hours, followed by subjecting to injection molding to provide test pieces. The test pieces were subjected to measurements of bending strength, modulus of elasticity, impact strength and thermal deformation temperature and also to a wear test. The results are shown in Table 8.

Example 50

5 kg of maleic anhydride-modified linear low density polyethylene (Admer NB550) and 50.5 g of 11-aminoundecanoic acid were sufficiently mixed in a Henschel mixer, followed by melt kneading at 260° C. by use of a twin-screw extruder. The resultant mixture was dried in vacuum at 80° C. for 12 hours, after which 0.5 kg of the mixture and 9.5 kg of polycarbonate (MI=4 g/10 minutes) were mixed in the Henschel mixer, followed by melt kneading at 300° C. by use of the twin-screw extruder to obtain a polycarbonate resin composition. The polycarbonate resin composition was dried at 120° C. for 8 hours. 4.5 kg of the polycarbonate resin composition and 0.5 kg of glass fibers (having a fiber length of 3 mm and a diameter of the fiber of 9 μm and treated with an aminosilane) were sufficiently mixed by means of the Henschel mixer, followed by kneading at 260° C. by means of the twin-screw extruder to obtain a glass fiber-reinforced polycarbonate resin composition comprised of 90 parts by weight of the polycarbonate resin composition and 10 parts by weight of the glass fibers. The glass fiber-reinforced polycarbonate resin composition dried at 120° C. for 8 hours, followed by injection molding to provide test pieces. The test pieces were subjected to measurements of bending strength, modulus of elasticity, impact strength and thermal deformation temperature and also to a wear test. The results are shown in Table 8.

composition and 50 parts by weight of the glass fibers were used, thereby obtaining a glass fiber-reinforced polycarbonate resin composition. The composition was subjected to injection molding to obtain test pieces, followed by measurements of bending strength, modulus of elasticity, impact strength and thermal deformation temperature and also by a wear test. The results are shown in Table 8.

TABLE 8

| | Specific Wear Loss ($\times 10^{-15}$ m$^3$/Nm) | Coefficient of Dynamic Friction | HDT (°C., 18.6 kgf/cm$^2$) | Tensile Strength (kgf/mm$^2$) | Flexural Strength/ Flexural Modulus (kgf/mm$^2$) | Izod Impact Strength (notched) (kgfcm/cm) |
|---|---|---|---|---|---|---|
| Ex. 38 | 5.2 | 0.23 | 142.3 | 12.92 | 19.23/842.31 | 15.6 |
| 39 | 4.2 | 0.19 | 140.2 | 12.13 | 18.92/819.82 | 17.5 |
| 40 | 2.8 | 0.15 | 142.1 | 11.42 | 18.05/725.01 | 19.6 |
| 41 | 4.5 | 0.19 | 140.2 | 12.25 | 18.92/819.83 | 17.6 |
| 42 | 5.0 | 0.20 | 140.0 | 12.09 | 18.97/821.35 | 17.1 |
| 43 | 4.2 | 0.i9 | 139.2 | 12.15 | 19.02/830.92 | 16.9 |
| 44 | 4.3 | 0.19 | 140.1 | 12.23 | 18.93/821.31 | 17.2 |
| 45 | 8.1 | 0.21 | 140.2 | 12.15 | 18.89/815.26 | 18.6 |
| 46 | 5.3 | 0.20 | 140.5 | 12.23 | 18.91/817.92 | 18.6 |
| 47 | 3.5 | 0.17 | 140.3 | 11.99 | 18.73/812.91 | 19.3 |
| 48 | 5.7 | 0.20 | 140.1 | 12.21 | 18.95/821.32 | 16.9 |
| 49 | 4.5 | 0.19 | 139.2 | 11.32 | 18.21/802.35 | 14.3 |
| 50 | 1.8 | 0.15 | 139.2 | 7.32 | 11.52/352.32 | 53.5 |
| Com.Ex. 23 | 12.3 | 0.25 | 142.5 | 13.21 | 19.43/851.31 | 14.3 |
| 24 | 10.2 | 0.21 | 140.3 | 12.21 | 18.63/809.91 | 16.9 |
| 25 | 21.4 | 0.25 | 140.3 | 11.92 | 18.21/812.31 | 14.6 |
| 26 | 17.3 | 0.22 | 140.5 | 12.39 | 18.92/816.31 | 12.3 |
| 27 | 9.9 | 0.20 | 141.0 | 6.91 | 10.12/341.4 | 40.3 |
| PC/PTFE/GF[1] | 8.3 | 0.18 | 143.5 | 12.73 | 19.32/819.91 | 10.9 |
| Com.Ex. 28 | 1.5 | 0.15 | 134.7 | 5.93 | 9.72/323.54 | 69.8 |
| 29 | 7.3 | 0.27 | 142.4 | 12.93 | 20.56/856.31 | 7.3 |

[1]A mixture of Lubriconp DL 4030 ® (7.0 kg) and glass fibers (3.0 kg). The mixture was kneaded in a twin-screw extruder. The glass fiber was the same as used in the Examples.

Comparative Example 27

The general procedure of Example 50 was repeated except that linear low density polyethylene (Linirex AM0710) was used instead of the maleic anhydride-modified low density polyethylene (Admer NB550) and that 11-aminoundecanoic acid was not added, thereby obtaining a glass fiber-containing composition. The thus obtained composition was subjected to injection molding to obtain test pieces, followed by measurements of bending strength, modulus of elasticity, impact strength and thermal deformation temperature and also by a wear test. The results are shown in Table 8.

Comparative Example 28

The general procedure of Example 38 was repeated except that 97 parts by weight of the polycarbonate resin composition and 3 parts by weight of the glass fibers were used, thereby obtaining a glass fiber-reinforced polycarbonate resin composition. The composition was subjected to injection molding to obtain test pieces, followed by measurements of bending strength, modulus of elasticity, impact strength and thermal deformation temperature and also by a wear test. The results are shown in Table 8.

Comparative Example 29

The general procedure of Example 38 was repeated except that 50 parts by weight of the polycarbonate resin As will be apparent from Table 8, the compositions of the invention exhibit both good mechanical strength and heat resistance and good sliding characteristics. In contrast, the compositions of the comparative examples 23 to 27 are poorer in the wear property. In addition, the compositions of the examples have characteristic properties similar to or greater than those of a known polycarbonate/fluorine resin (PTFE) sliding material set out as a reference in the table.

EFFECT OF THE INVENTION

According to the invention, the PC-polyolefin resin compositions having good mechanical characteristics, heat resistance and surface properties can be obtained from readily available starting materials. These compositions which have good properties as set out above are useful as a material for interior and exterior parts of automobiles and electric and electronic appliances, housings, and machine parts such as gears, cams and the like.

According to the process of the invention, PC/polyolefin resin compositions having good mechanical strength, heat resistance and miscibility can be readily obtained by a melt kneader.

According to the invention, the polycarbonate/ polyethylene resin compositions can be provided as having good mechanical characteristics, heat resistance and sliding characteristics. By this, polycarbonate sliding parts can be provided as a substitute for the known PC/PTFE sliding material and as being more inexpensive, coupled with the advantages that the problem of generation of harmful gases on combustion of PTFE can be solved and that such parts are good from the ecological standpoint. The composition of the invention and moldings thereof have utility as parts (such as gears, cams and the like) in the fields of office automation devices, automobiles, and domestic appliances.

According to the invention, polycarbonate/polyolefin resin composition having good mechanical characteristics, heat resistance and organic solvent resistance can be provided. By this, polycarbonate-based parts which are a substitute for known PC/polyester compositions and which are more inexpensive and better in organic solvent resistance can be provided. The composition of the invention and moldings thereof making use of the above characteristics are useful as parts of automobiles, OA devices, domestic appliances and the like.

The glass fiber-reinforced polycarbonate resin compositions of the invention are excellent in mechanical characteristics, heat resistance and sliding characteristics. By this, there can be provided more inexpensive polycarbonate-based sliding parts in place of known PC/PTFE sliding materials, so that the problem of the generation of harmful gases on combustion of PTFE can be solved. The composition of the invention and moldings obtained therefrom are useful mechanical parts in the fields of OA devices, automobiles, domestic appliances and the like while making use of their characteristic properties.

We claim:

1. A polycarbonate/polyolefin based resin composition exhibiting an improved polycarbonate/polyolefin compatibility prepared by melt kneading (A) a polycarbonate resin;

(B) a polyolefin resin;

(C) a polyolefin resin that has been modified with at least one functional group selected from the group consisting of epoxy, carboxyl, and an acid anhydride groups; and (D) a compound represented by the formula:

HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group.

2. A polycarbonate/polyolefin based resin composition exhibiting an improved polycarbonate/polyolefin compatibility according to claim 1 wherein 40 to 99% by weight of the component (A);

greater than 0% and no greater than 60% by weight of the component (B);

0.5 to 60% by weight of the component (C); and 0.05 to 5% by weight of the component (D) are used.

3. A polycarbonate/polyolefin based resin composition exhibiting an improved polycarbonate/polyolefin compatibility according to claim 1 wherein 1 to 99% by weight of the component (A);

greater than 0% and no greater than 98% by weight of the component (B);

0.5 to 99% by weight of the component (C); and 0.05 to 5% by weight of the component (D) are used.

4. A molded article produced by melt molding the resin composition according to claim 1.

5. A molded material having an improved solvent resistance comprising the molded article according to claim 4.

6. A molded material having improved wear resistant properties comprising the molded article according to claim 4.

7. A glass fiber-reinforced resin composition comprising
    95 to 60% by weight of the polycarbonate/polyolefin based resin composition according to claim 1; and
    5 to 40% by weight of glass fibers.

8. A molded article produced by melt molding the glass fiber-reinforced resin composition according to claim 7.

9. A molded material having an improved solvent resistance comprising the molded article according to claim 8.

10. A molded material having improved wear resistant properties comprising the molded article according to claim 8.

11. A process for producing the resin composition according to claim 1 comprising the step of melt kneading a compatibilizer precursor prepared by reacting the polyolefin resin (C) and the compound (D)

with the polycarbonate resin (A) and the polyolefin resin (B) simultaneously or sequentially in an arbitrary order.

12. A process for producing the resin composition according to claim 1 comprising the step of melt kneading a compatibilizer prepared by reacting the polycarbonate resin (A), the polyolefin resin (C), and the compound (D)

with the polycarbonate resin (A) and the polyolefin resin (B) simultaneously or sequentially in an arbitrary order.

13. A process for producing the resin composition according to claim 1 comprising the steps of melt kneading the polyolefin resin (B), an acid anhydride, and the compound (D) represented by the formula:

HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group so that a part of the polyolefin resin (B) undergoes an in situ conversion to form the modified polyolefin resin (C) through reaction of the polyolefin resin (B) and the acid anhydride; and continuing the melt kneading after adding the polycarbonate resin (A) simultaneously or sequentially in an arbitrary order.

14. A process for producing the resin composition according to claim 1 comprising the steps of melt kneading the polycarbonate resin (A) and the compound (D) represented by the formula:

HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group; and continuing the melt kneading after adding the polyolefin resin (B), the polyolefin resin (C) that has been modified with at least one functional group selected from the group consisting of epoxy, carboxyl, and an acid anhydride groups, and a further addition of the polycarbonate resin (C) in an arbitrary order.

15. A resin composition according to claim 1 wherein
    the modified polyolefin resin (C) is the polyolefin resin modified with at least one functional group selected from the group consisting of carboxyl and an acid anhydride groups; and the resin composition has been produced through reaction of the modified polyolefin resin (C) with the compound (D) represented by the formula:

HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group, whereby a linkage represented by formula (H):

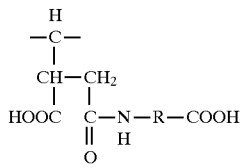
(H)

is produced.

16. A resin composition according to claim 1 wherein the modified polyolefin resin (C) is the polyolefin resin modified with epoxy group; and the resin composition has been produced through reaction of the modified polyolefin resin (C) with the compound (D) represented by the formula:

HOOC—R—NH$_2$ wherein R represents at least one member selected from the group consisting of an alkene group, an alkylidene group, and an oligomethylene group containing 5 or more carbon atoms, and phenylene group and naphthylene group optionally substituted with an alkyl group, whereby a linkage represented by formula (J):

(J)

is produced.

17. A molded material having an improved solvent resistance comprising a molded article produced by melt molding the resin composition according to claim 1 wherein the polyolefin is dispersed in the polycarbonate in particulate form, and the particulate polyolefin present in the region from surface of the article to a depth of 20 μm has an average aspect ratio (major axis/minor axis) of up to 5.

18. A molded material having improved wear resistant properties comprising a molded article produced by melt molding the resin composition according to claim 1 wherein the polyolefin is dispersed in the polycarbonate in particulate form, and the particulate polyolefin present in the region from surface of the article to a depth of 20 μm has an average aspect ratio (major axis/minor axis) of up to 5.

* * * * *

UNITED STATES PATENT AND TRADEMARK OFFICE
CERTIFICATE OF CORRECTION

PATENT NO. : 5,847,041
DATED : December 8, 1998
INVENTOR(S) : Kazuya Takemura; Masahiko Kajioka; Kazumichi Sashi; Shigeru Takano; and Eiichi Sumita It is certified that error appears in the above-identified patent and that said Letters Patent is hereby corrected as shown below:

Column 52, line 64, "C" should read --A--.

Signed and Sealed this

Fourteenth Day of September, 1999

Attest:

Q. TODD DICKINSON

*Attesting Officer*   *Acting Commissioner of Patents and Trademarks*